United States Patent
Willis et al.

(10) Patent No.: US 7,942,604 B2
(45) Date of Patent: May 17, 2011

(54) PROPULSION AND STEERING SYSTEM FOR A ROAD MILLING MACHINE

(75) Inventors: Paul E. Willis, Orrstown, PA (US); Justin Zupanc, Shippensburg, PA (US)

(73) Assignee: Volvo Construction Equipment AB, Eskilstuna (SE)

( * ) Notice: Subject to any disclaimer, the term of this patent is extended or adjusted under 35 U.S.C. 154(b) by 149 days.

(21) Appl. No.: 12/442,102

(22) PCT Filed: Sep. 28, 2007

(86) PCT No.: PCT/US2007/020905
§ 371 (c)(1),
(2), (4) Date: Apr. 21, 2009

(87) PCT Pub. No.: WO2008/042244
PCT Pub. Date: Apr. 10, 2008

(65) Prior Publication Data
US 2010/0021234 A1    Jan. 28, 2010

Related U.S. Application Data

(60) Provisional application No. 60/848,515, filed on Sep. 29, 2006.

(51) Int. Cl.
*E01C 23/09* (2006.01)
(52) U.S. Cl. .................. 404/84.05; 404/83; 404/85
(58) Field of Classification Search ........... 404/83–84.5, 404/90, 93, 94
See application file for complete search history.

(56) References Cited

U.S. PATENT DOCUMENTS

| | | | |
|---|---|---|---|
| 3,664,448 A | | 5/1972 | Hudis |
| 3,900,077 A | * | 8/1975 | Gee et al. ............. 180/9.46 |
| 3,966,345 A | * | 6/1976 | Kofel .................... 404/126 |
| 4,029,165 A | | 6/1977 | Miller et al. |
| 4,325,580 A | * | 4/1982 | Swisher et al. ......... 299/39.8 |
| 4,387,814 A | | 6/1983 | Beduhn et al. |
| 4,579,182 A | | 4/1986 | Dewing et al. |
| 4,929,121 A | * | 5/1990 | Lent et al. ............. 404/84.05 |
| 5,009,279 A | * | 4/1991 | Matsuda ............... 180/197 |
| 5,562,175 A | * | 10/1996 | Bjorsne et al. ......... 180/419 |
| 5,575,583 A | * | 11/1996 | Grembowicz et al. ...... 404/72 |
| 6,435,766 B1 | * | 8/2002 | Titford .................. 404/75 |
| RE38,632 E | * | 10/2004 | Schmidt et al. .......... 701/41 |
| 6,997,641 B2 | * | 2/2006 | Gaertner et al. .......... 404/93 |
| RE39,834 E | * | 9/2007 | Kieranen et al. ....... 404/84.5 |
| 2006/0024134 A1 | * | 2/2006 | Rio et al. ............... 404/94 |
| 2006/0129280 A1 | * | 6/2006 | Thomas et al. ......... 700/275 |
| 2007/0284933 A1 | * | 12/2007 | Rotz et al. ............. 299/39.4 |

* cited by examiner

*Primary Examiner* — Raymond W Addie
(74) *Attorney, Agent, or Firm* — Michael Best & Friedrich LLP

(57) ABSTRACT

A propulsion system is for a road milling machine with a rotatable cutter drum (3). The system includes four crawler assemblies (12) movably coupled with the mainframe so as to define front and rear, and left and right, pairs of crawler assemblies. Four steering actuators (14) are each coupled with a separate crawler assembly and each angularly displaces the crawler about a vertical axis (12a). A first pump (16A) is fluidly coupled with the left pair of crawlers and a second pump (16B) is fluidly coupled with the right pair of crawlers. A control (20) is configured to selectively operate the four actuators in a plurality of different steering modes, one steering mode being a circle steer mode, and to operate the two pumps such that one of the left and right pairs of crawlers are drivable by the first pump in one direction while the other pair of crawlers are drivable in an opposing direction.

57 Claims, 24 Drawing Sheets

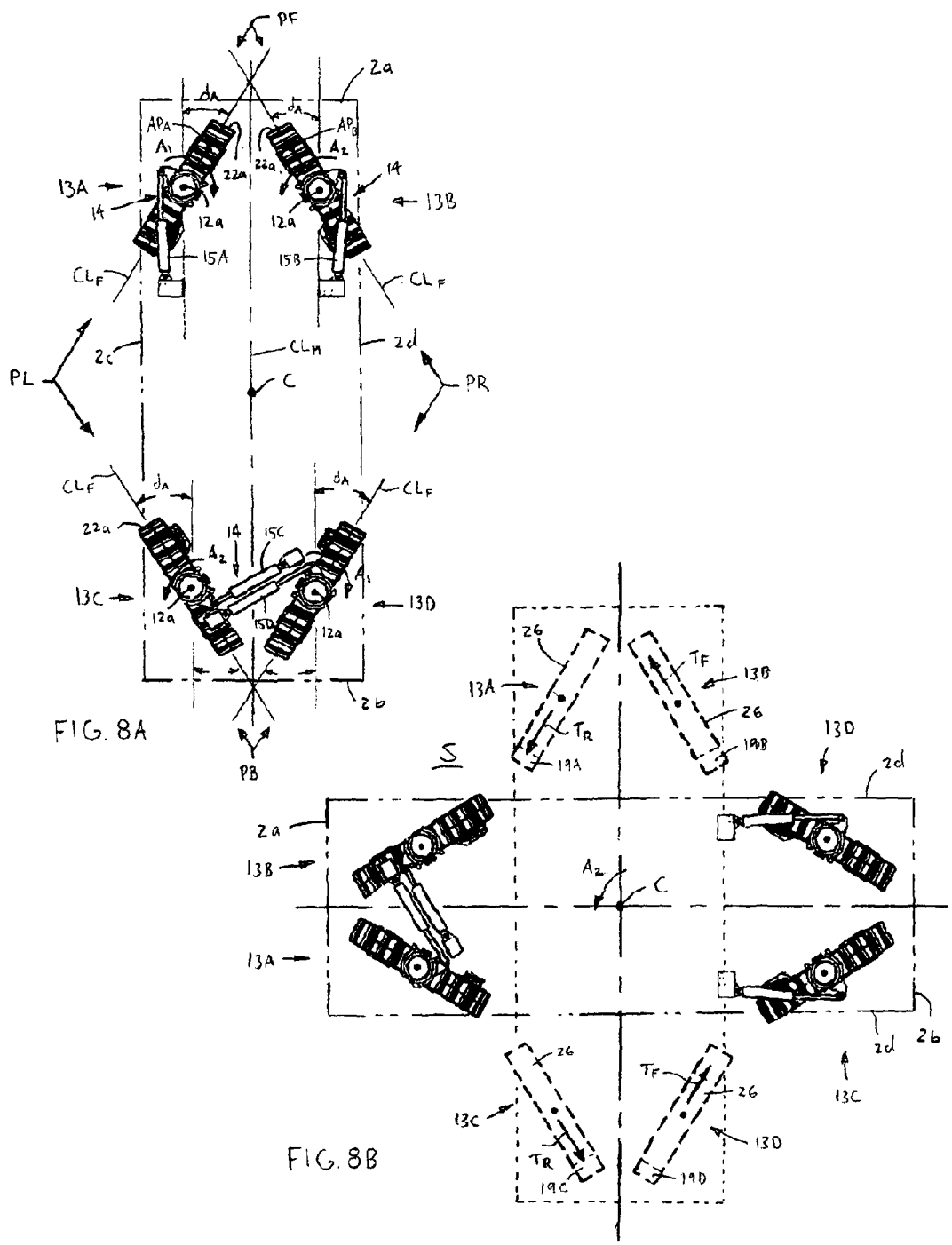

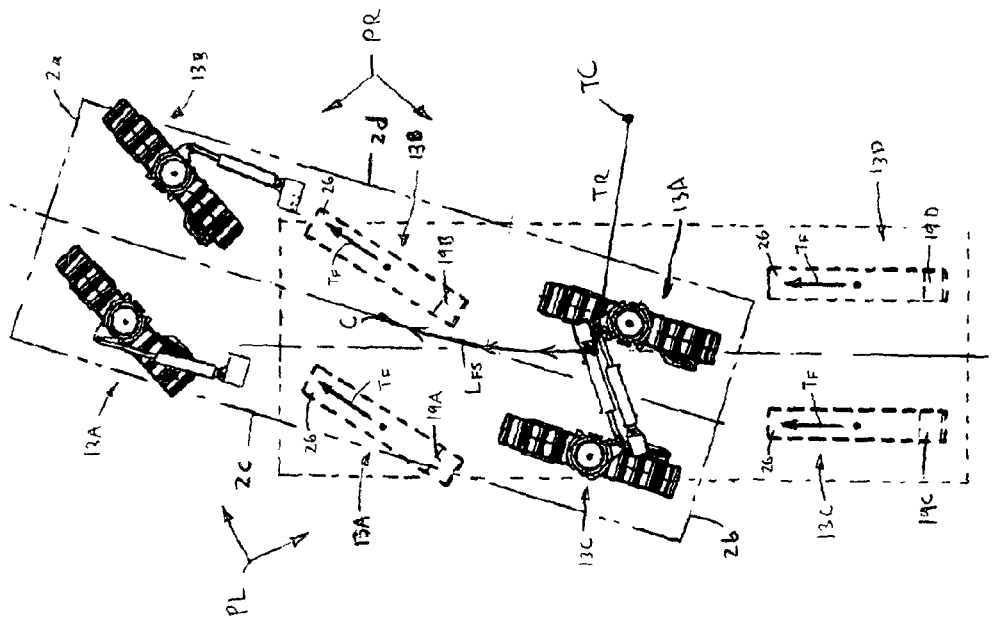

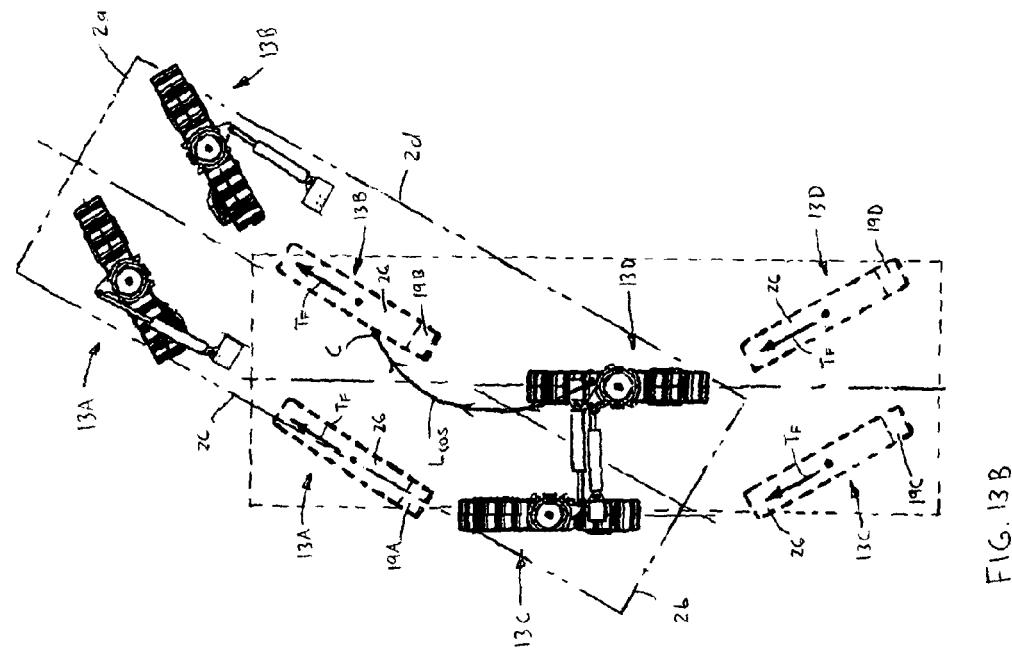
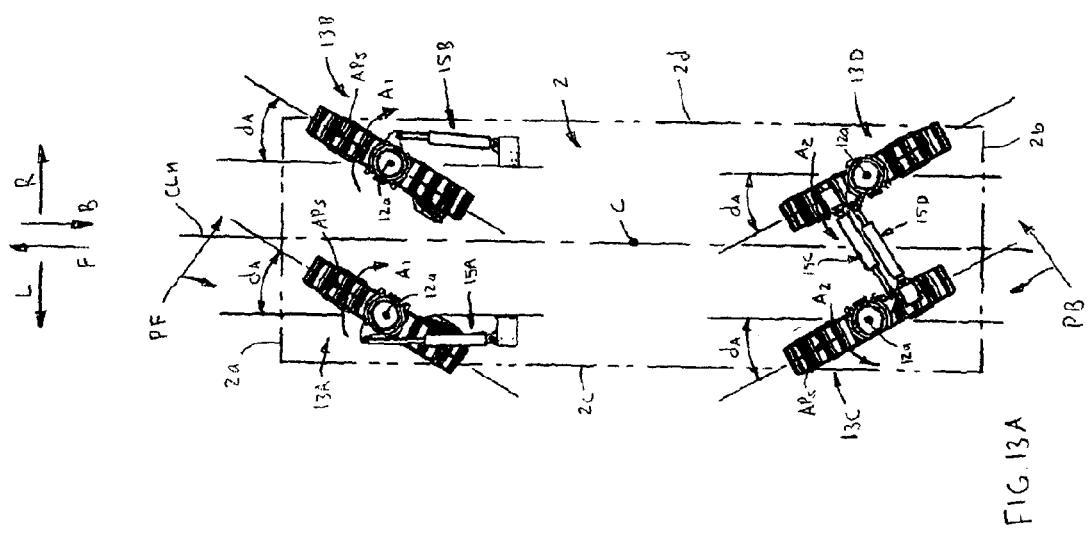

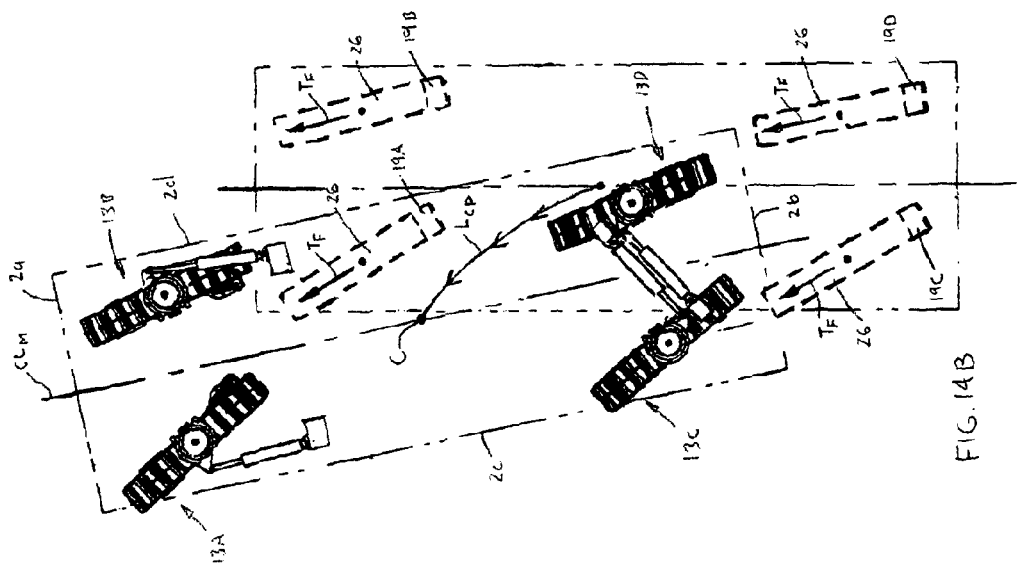
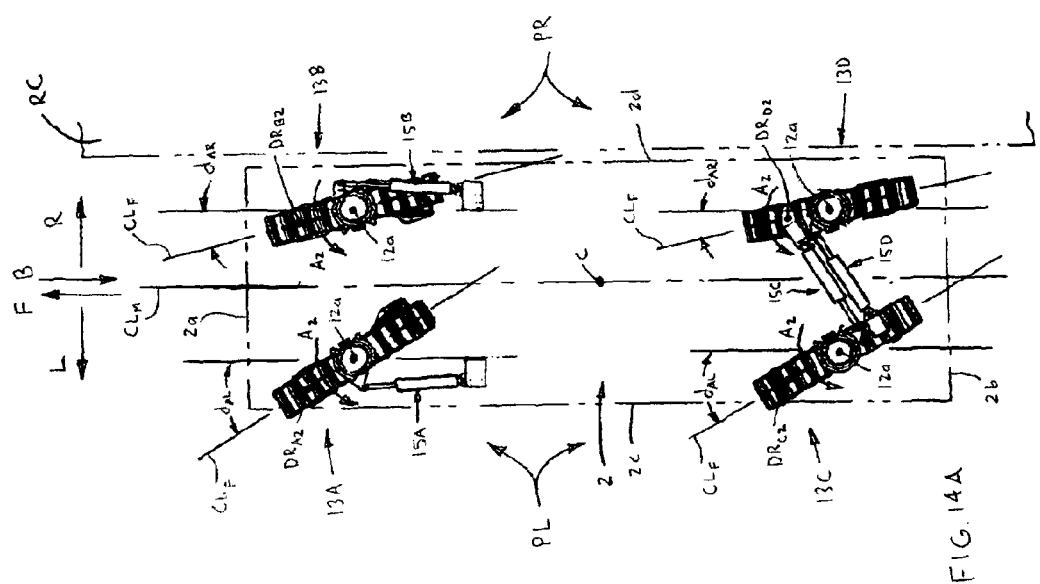

US 7,942,604 B2

PROPULSION AND STEERING SYSTEM FOR A ROAD MILLING MACHINE

CROSS-REFERENCE TO RELATED APPLICATIONS

This patent application is a national stage filing under 35 U.S.C. 371 of International Application No. PCT/US2007/020905, filed 28 Sep. 2007, which claims priority to U.S. Provisional Patent Application Ser. No. 60/848,515, filed 29 Sep. 2006, the entire contents of which are hereby incorporated by reference. Priority to each application is hereby claimed.

The present invention relates to road construction machinery, and more particularly to propulsion and steering systems for road milling machines.

One type of road construction vehicle, commonly referred to as a road milling machine, generally includes a mainframe, a cutting drum rotatably mounted to the mainframe for removing material (e.g., asphalt, concrete) from a roadbed, a conveyor for transporting material cuttings, and three or four crawler assemblies. Each crawler assembly includes a plurality of wheels driving an endless track and a motor directly driving one of the wheels, and is rotatably or pivotally connected with the mainframe to enable turning or steering of the milling machine. Generally, the milling machine includes one or more steering actuators to turn the crawler assemblies, which are often connected such that the front and/or rear crawler assemblies are steered as a single unit. Further, milling machines generally include a pump for operating the crawler motors, which are often hydraulic motors.

SUMMARY OF THE INVENTION

In one aspect, the present invention is a propulsion and steering system for a road milling machine, the milling machine including a mainframe with front and rear ends, a center, and a centerline extending between the two ends and through the center, and a rotatable cutter drum coupled with the mainframe. The propulsion and steering system comprises four crawler assemblies each movably coupled with the mainframe so as to define front and rear pairs of crawler assemblies. Each crawler assembly has a vertical axis, is angularly displaceable about the vertical axis, and includes a frame with a centerline, a plurality of wheels rotatably mounted to the frame, and an endless track disposed about the wheels. A motor is configured to rotate at least one wheel in opposing angular directions so as to drive the endless track in opposing angular directions about the plurality of wheels and generally along the frame centerline. Four steering actuators are each operatively coupled with a separate one of the four crawler assemblies and are each configured to angularly displace the coupled crawler assembly about the crawler vertical axis. Further, a control is operatively coupled with each one of the four steering actuators and configured to selectively operate the four actuators in a plurality of different steering modes. One steering mode is a circle steer mode in which the control directs the four actuators such that one of the front pair of crawler assemblies angularly displaces in a first direction about the crawler vertical axis, the other one of the front pair of crawler assemblies angularly displaces in a second, opposing direction about the crawler vertical axis, one of the rear pair of crawler assemblies angularly displaces in the first direction about the crawler axis, and the other one of the rear pair of crawler assemblies angularly displaces in the second direction about the crawler axis.

In another aspect, the present invention is again a propulsion and steering system for a road milling machine, the milling machine including a mainframe with a center, front and rear ends and left and right sides. The propulsion and steering system comprises four crawler assemblies configured to displace the mainframe. Each crawler assembly includes a frame movably coupled with the mainframe so as to be angularly displaceable with respect to the mainframe about a generally vertical axis and having a generally horizontal centerline, a plurality of wheels each rotatably coupled with the wheel frame and spaced along the frame centerline, an endless track disposed about the plurality of wheels and displaceable generally along the centerline. A hydraulic motor is connected with one of the wheels of each crawler assembly, is drivable in opposing directions and is configured to rotate the connected drive wheel so as to circulate the track in generally forward and reverse directions about the wheels. The four crawler assemblies are spaced apart and located with respect to the main frame so as to define a left pair of crawler assemblies, including a front left crawler assembly and a rear left crawler assembly, and a right pair of crawler assemblies, which includes a front right crawler assembly and a rear right crawler assembly. Further, four steering actuator assemblies are each operatively coupled with a separate one of the crawler assemblies and are each configured to angularly displace the coupled crawler assembly about the vertical axis. Furthermore, the propulsion and steering system also includes first and second pumps, the first pump being fluidly coupled with the two motors of the left pair of crawler assemblies and the second pump being fluidly coupled with the two motors of the right pair of crawler assemblies. Each pump is configured to direct hydraulic fluid to each one of coupled motors so as to drive the two motors alternatively in forward and reverse directions. A control is operatively coupled with each of the four steering actuators and with each of the two pumps, the control being configured to separately operate each steering actuator such that each crawler assembly is independently angularly positionable about the crawler axis and configured to operate the two pumps such the two motors of the left pair of crawler assemblies are drivable/being driven by the first pump in one of the forward and reverse directions while the two motors of the right pair of crawler assemblies are drivable/being driven by the second pump in the other one of the forward and reverse directions.

In a further aspect, the present invention is once again a propulsion and steering system for a road milling machine, the milling machine including a mainframe with a center. The propulsion system comprises four crawler assemblies each including a frame movably coupled with the mainframe so as to be angularly displaceable with respect to the mainframe about a generally vertical axis and having a generally horizontal centerline. A plurality of wheels are each rotatably coupled with the crawler frame and are spaced along the frame centerline, an endless track is disposed about the plurality of wheels and displaceable generally along the centerline, and a motor is configured to rotate the track in first and second angular directions about the wheels. The four wheel assemblies are spaced apart and located with respect to the main frame so as to define a front left crawler assembly, a front right crawler assembly, a rear left crawler assembly and a rear right crawler assembly. Four steering actuator assemblies are each operatively coupled with a separate one of the crawler assemblies and are configured to angularly displace the coupled crawler assembly about the vertical axis. Further, a control is operatively coupled with each of the steering actuators and with each of the motors, the control being configured to sense a speed of each crawler assembly track, to compare the speeds of the tracks of the front left and rear left crawler assemblies and to compare the speeds of the tracks of the front right and rear right crawler assemblies. The control is further configured to reduce motor speed of one of the left crawler assemblies when the sensed speed of the track of the one left crawler assembly is greater than the sensed track speed of the other left crawler assembly until the sensed track speed of each one of the two left crawler assemblies is generally equal to the sensed track speed of the other one of the two left crawler assemblies. Further, the control is also configured to reduce motor speed of one of the two right crawler assemblies when the sensed speed of the track of the one right crawler assembly is greater than the sensed track speed of the other right crawler assembly until the sensed track speed of each one of the two right crawler assemblies is generally equal to the sensed track speed of the other one of the two right crawler assemblies.

In yet another aspect, the present invention is a road milling machine comprising a mainframe with front and rear ends and a center, a rotatable cutter drum coupled with the main frame, and four crawler assemblies. Each crawler assembly is movably coupled with the mainframe so as to be angularly displaceable about a vertical axis and includes a frame, a plurality of wheels rotatably mounted to the frame, an endless track disposed about the wheels, and a motor configured to rotate at least one of the wheels in opposing angular directions so as to thereby drive the endless belt in opposing angular directions about the plurality of wheels. The four crawler assemblies are spaced apart and located with respect to the mainframe so as to define front and rear pairs of crawler assemblies. Further, four steering actuators are each operatively coupled with a separate one of the four crawler assemblies and are each configured to angularly displace the coupled crawler assembly about the vertical axis. Further, a control is operatively coupled with each one of the four steering actuators and with each one of the four motors, the control being configured to separately operate each actuator such that each crawler assembly is angularly displaceable about the associated vertical axis independently of the other three crawler assemblies and to separately operate each motor such that each crawler endless track is rotated about the associated plurality of wheels independently of the endless tracks of the other three crawler assemblies.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 8A is a top plan view of the crawler assemblies and steering actuators as positioned in a circle steer mode $MS_{CS}$;

FIG. 8B is another top plan view of the crawler assemblies and steering actuators of FIG. 8A, shown after displacement in the circle steer mode $MS_{CS}$ and with the initial position indicated in phantom;

FIG. 10A is a top plan view of the crawler assemblies and steering actuators as positioned in a front steer mode $MS_{FS}$;

FIG. 10B is another top plan view of the crawler assemblies and steering actuators of FIG. 10A, shown after displacement in the front steer mode $MS_{FS}$ and with the initial position in phantom;

FIG. 13A is a top plan view of the crawler assemblies and steering actuators as positioned in a coordinated steer mode $MS_{COS}$;

FIG. 13B is another top plan view of the crawler assemblies and steering actuators of FIG. 13A, shown after displacement in the coordinated steer mode $MS_{COS}$ and with the initial position in phantom;

FIG. 14A is a top plan view of the crawler assemblies and steering actuators as positioned in a curb pullaway mode $MS_{CPA}$;

FIG. 14B is another top plan view of the crawler assemblies and steering actuators of FIG. 14A, shown after displacement in the curb pullaway mode $MS_{CPA}$ and with the initial position in phantom;

FIG. 18 is a modified flow diagram showing operation of the control to correct crawler assembly slippage

FIG. 27, are each a more diagrammatic, side plan view of the motor of FIG. 26, each showing the motor adjusted to a separate one of three different motor settings;

DETAILED DESCRIPTION OF THE INVENTION

Figure 1:
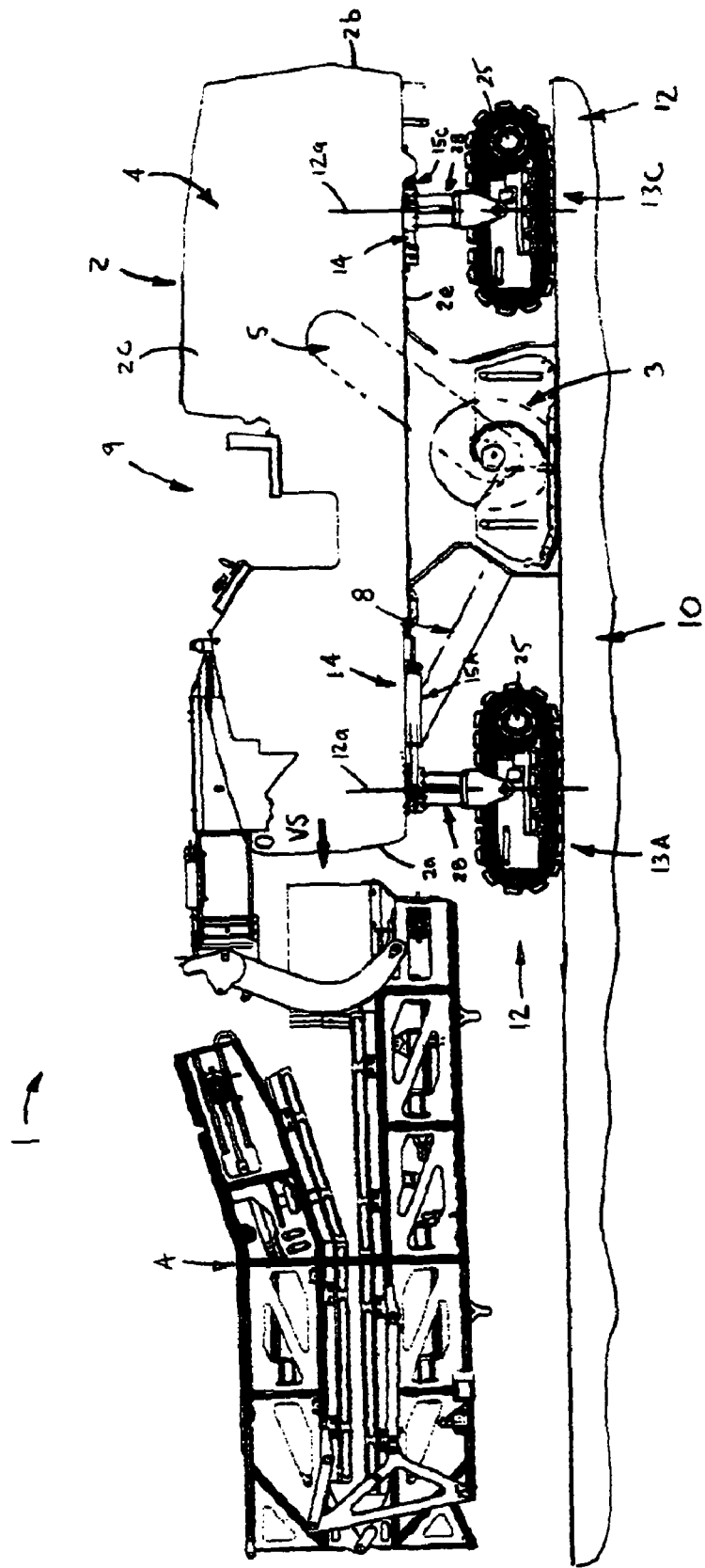
FIG. 1 is side elevational view of a road milling machine having propulsion and steering system in accordance with the present invention.

Certain terminology is used in the following description for convenience only and is not limiting. The words "upper", "upward", "down" and "downward" designate directions in the drawings to which reference is made. The words "inner", "inwardly" and "outer", "outwardly" refer to directions toward and away from, respectively, a designated centerline or a geometric center of an element or assembly being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import. Furthermore, the term "position" is used herein to indicate a position, location, configuration, orientation, etc., of one or more components of a propulsion and steering system and each is depicted in the drawings with reference to a randomly selected point on the item being described. Such points in the drawing figures are randomly selected for convenience only and have no particular relevance to the present invention.

Referring now to the drawings in detail, wherein like numbers are used to indicate like elements throughout, there is shown in FIGS. 1-29 a propulsion and steering system 10 for a road milling machine 1 in accordance with the present invention. The milling machine 1 includes a mainframe 2 with front and rear ends 2a, 2b, left and right sides 2c, 2d, a center C, and a centerline $CL_M$ extending through the center C and between the two ends 2a, 2b. A rotatable cutter drum 3 (FIG. 1) is coupled with the mainframe 2 and functions as the primary working tool of the machine 1, other various supporting components being discussed below. The presently preferred propulsion and steering system 10 basically comprises four crawler assemblies 12 each movably coupled with the mainframe 2, four steering actuators 14 each operatively coupled with a separate crawler assembly 12, first and second pumps 16A, 16B each operatively or fluidly coupled with two motors 18 of the four crawler assemblies 12, and a control 20. The control 20 is operatively coupled with each one of the four steering actuators 14, with each one of the pumps 16A, 16 and/or the four motors 18 of the crawler assemblies 12, as described in detail below.

Figure 3:
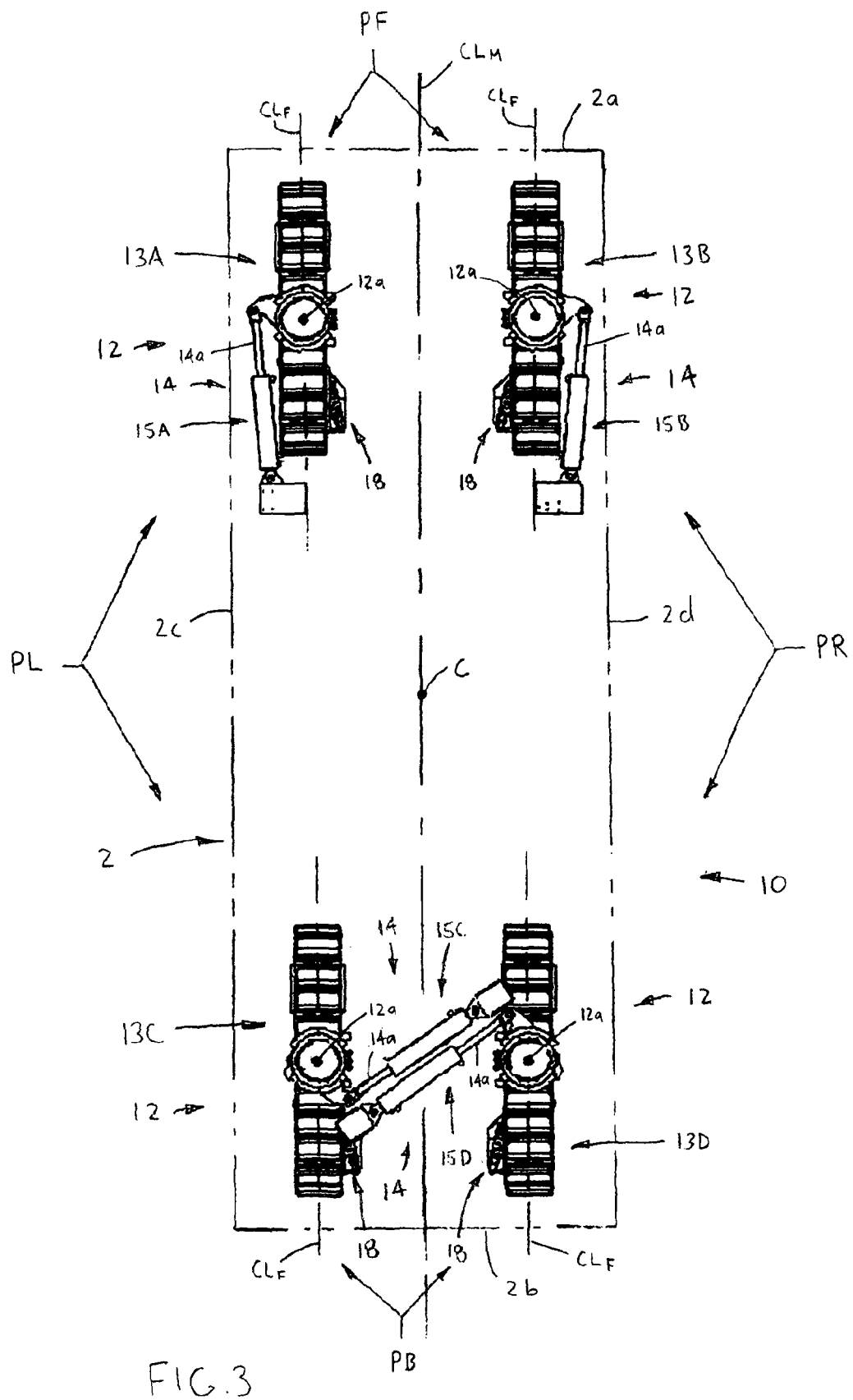
FIG. 3 is a top plan view of the four crawler assemblies and four steering actuators connected with the crawler assemblies, shown with the mainframe in phantom.

As best shown in FIG. 3, the four crawler assemblies 12 are arranged with respect to the mainframe 2 so as to define front and rear pairs PF, PB of crawler assemblies 12, as well as left and right pairs PL, PR of crawler assemblies 12, for reasons described below. As such, the four crawler assemblies 12 are individually designated as a front left assembly 13A, a front right assembly 13B, a rear left assembly 13C, and a rear right assembly 13D. Each crawler assembly 12 has a vertical axis 12a and is configured to be angularly displaceable about the axis 12a in a first, clockwise angular direction $A_1$ and an opposing, second or counter-clockwise angular direction $A_2$, as indicated in FIGS. 8-14

Figure 2:
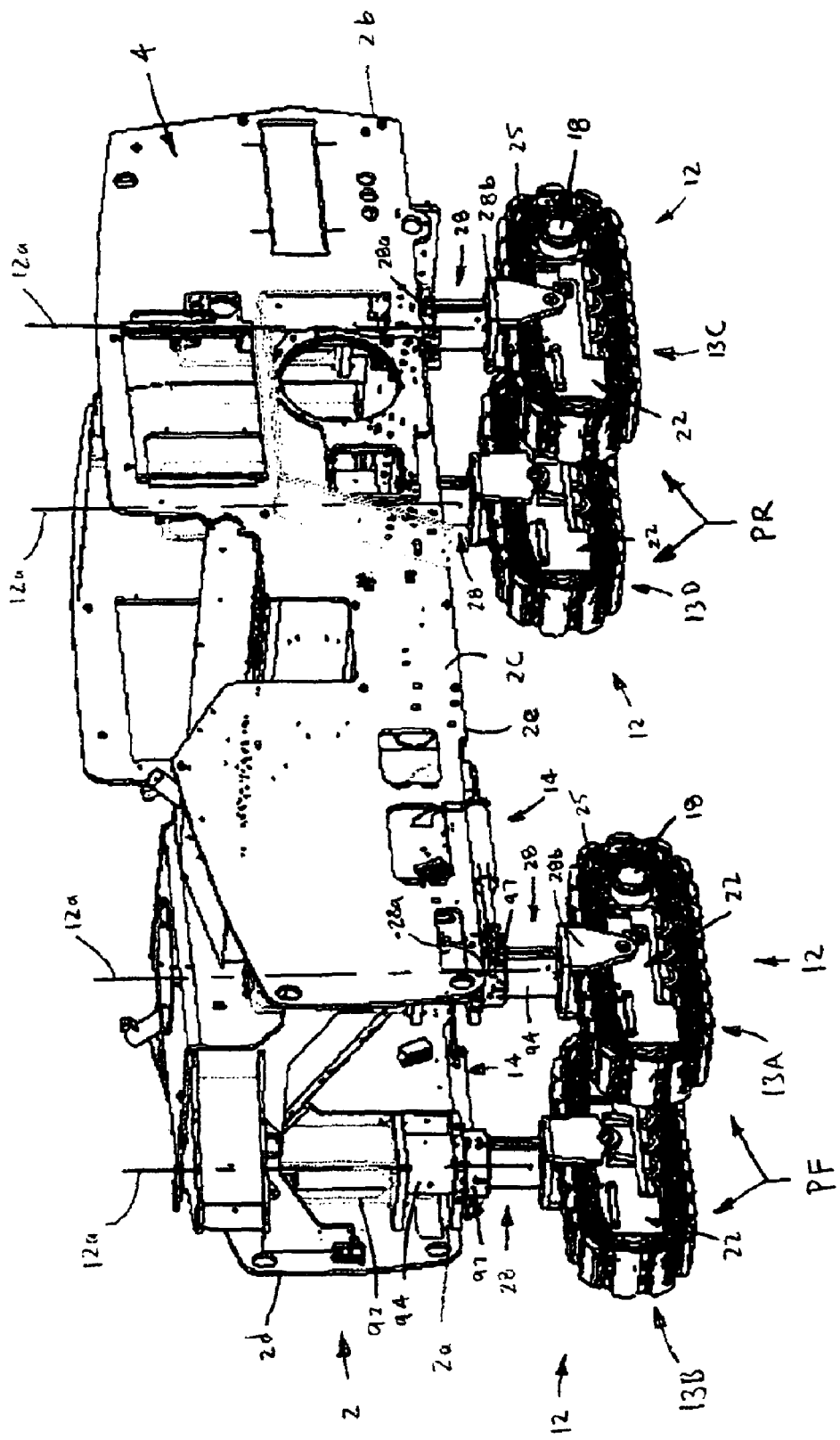
FIG. 2 is a perspective view of the milling machine mainframe and four crawler assemblies connected with the mainframe.
Figure 4:
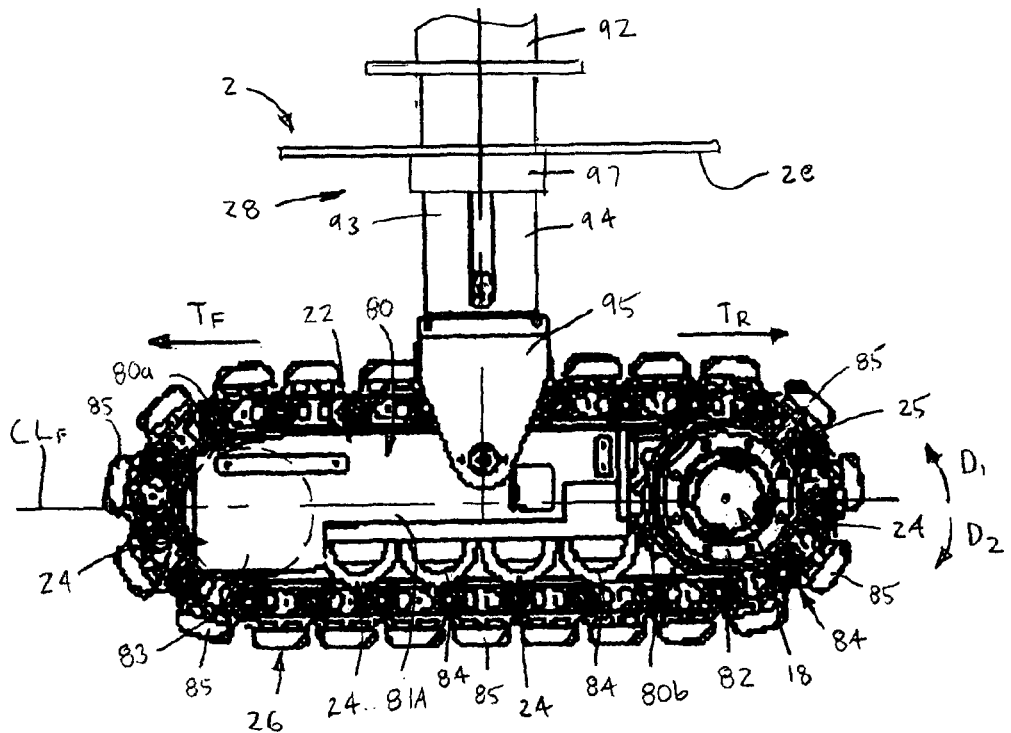
FIG. 4 is a partly broken-way, side elevational view of one crawler assembly.
Figure 5:
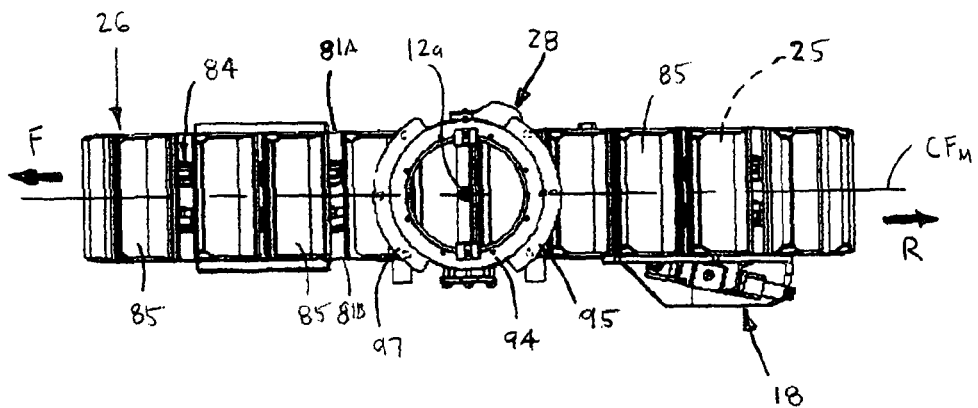
FIG. 5 is a top plan view of the one crawler assembly.
Figure 6:
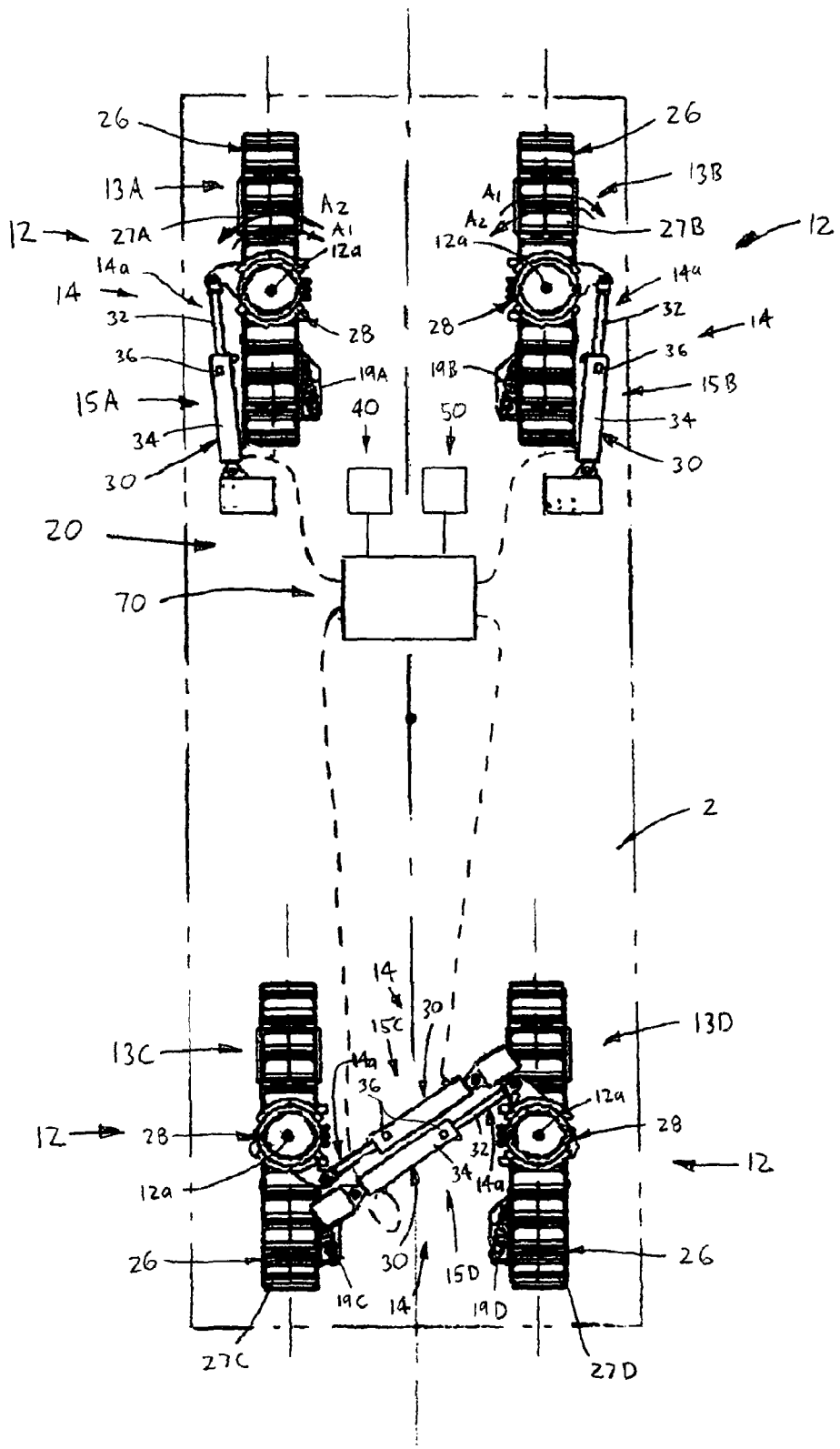
FIG. 6 is another top plan view of the four crawler assemblies and steering actuators, diagrammatically depicting portions of a control of the propulsion and steering system.

Referring particularly to FIGS. 4-6, each crawler assembly 12 preferably includes a frame 22 with a centerline $CL_F$, a plurality of wheels 24 rotatably mounted to the frame 22, an endless track 26 disposed about the wheels 24, and a motor 18. One of the wheels 24 of each crawler assembly 12 is a drive wheel 25 and the motor 18 is configured to rotate the drive wheel 25 in opposing, first and second angular directions $D_1$, $D_2$ (see FIG. 4). Preferably, each motor 18 is a reversible hydraulic motor such that the motor shaft 18a is rotatable in the opposing, forward and reverse directions $f_m$, $r_m$ by reversing fluid flow, as described below, so as to rotate the drive wheel 25 respectively in the opposing directions $A_1$, $A_2$. Furthermore, each drive wheel 25 is engaged with the associated crawler track 26 such that rotation of the wheel 25 in the first and second directions $D_1$, $D_2$ drives or circulates the crawler track 26 in opposing first and second angular directions $T_F$, $T_R$, respectively, about the plurality of wheels 24 and at least partially generally along the frame centerline $CL_F$. As such, when a crawler track 26 is driven in the first or forward direction $T_F$, the associated crawler assembly 12 displaces (or tends to displace) generally in a forward direction F and when the track 26 is alternatively driven in the second or reverse direction $T_R$, the crawler assembly 12 displaces/tends to displace generally in a rearward or reverse direction B. Additionally, each crawler assembly 12 is preferably rotatably connected with the mainframe by a generally vertical shaft 28. As best shown in FIG. 2, each shaft 28 has a first end 28a connected with the mainframe 2 and a second end 28b connected with the crawler frame 22, the crawler vertical axis 12a extending generally centrally through the shaft 28.

Referring particularly to FIG. 6, as discussed above, the four steering actuators 14 are each operatively coupled with a separate one of the four crawler assemblies 12 and configured to angularly displace the coupled crawler assembly 12 about the crawler vertical axis 12a alternatively in the opposing directions $A_1$ and $A_2$. Each steering actuator 14 is preferably connected with the shaft 28 of the coupled crawler assembly 12, such that the actuator 14 rotates the shaft 28 to rotate the crawler assembly 12, but may alternatively be connected directly with the associated crawler assembly 12 (e.g., with the frame 22). Preferably, each steering actuator 14 includes a linearly displaceable member 14a connected with the frame 22 of the coupled crawler assembly 12, such that movement of the displaceable member 14a rotatably displaces the frame 22, and thus the remainder of the crawler assembly 12, about the crawler vertical axis 12a. Most preferably, each steering actuator 14 is a hydraulic cylinder 30 having a rod 32 connected with either the coupled crawler assembly 12 or the mainframe 2 and a cylinder body 34 connected with the other one of the crawler assembly 12 and the mainframe 2. The rod 32 is linearly displaceable with respect to the cylinder body 34 so as to angularly displace the crawler assembly 12 about the crawler axis 12a. Additionally, each steering actuator 14 further includes a linear position sensor 36 coupled with the control 20 and configured to sense the linear position of the rod 32 with respect to the cylinder body 34 so as to thereby sense an angular position $AP_N$ of the crawler assembly 12 about the crawler axis 12a, as discussed in further detail below.

Figure 7:
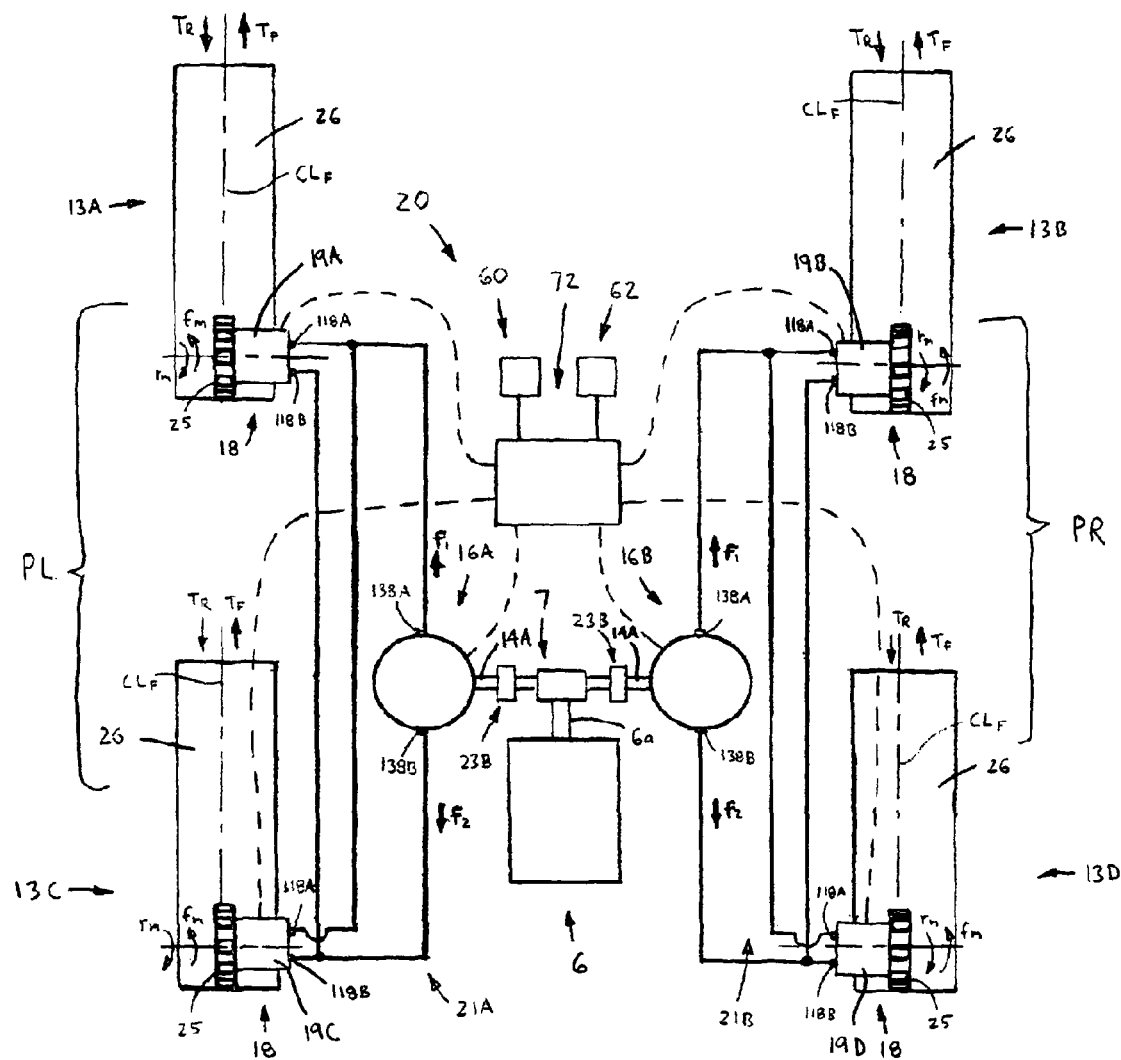
FIG. 7 is a more diagrammatic view of the propulsion and steering system, showing two pumps and four crawler motors operably coupled with the control.
Figure 21:
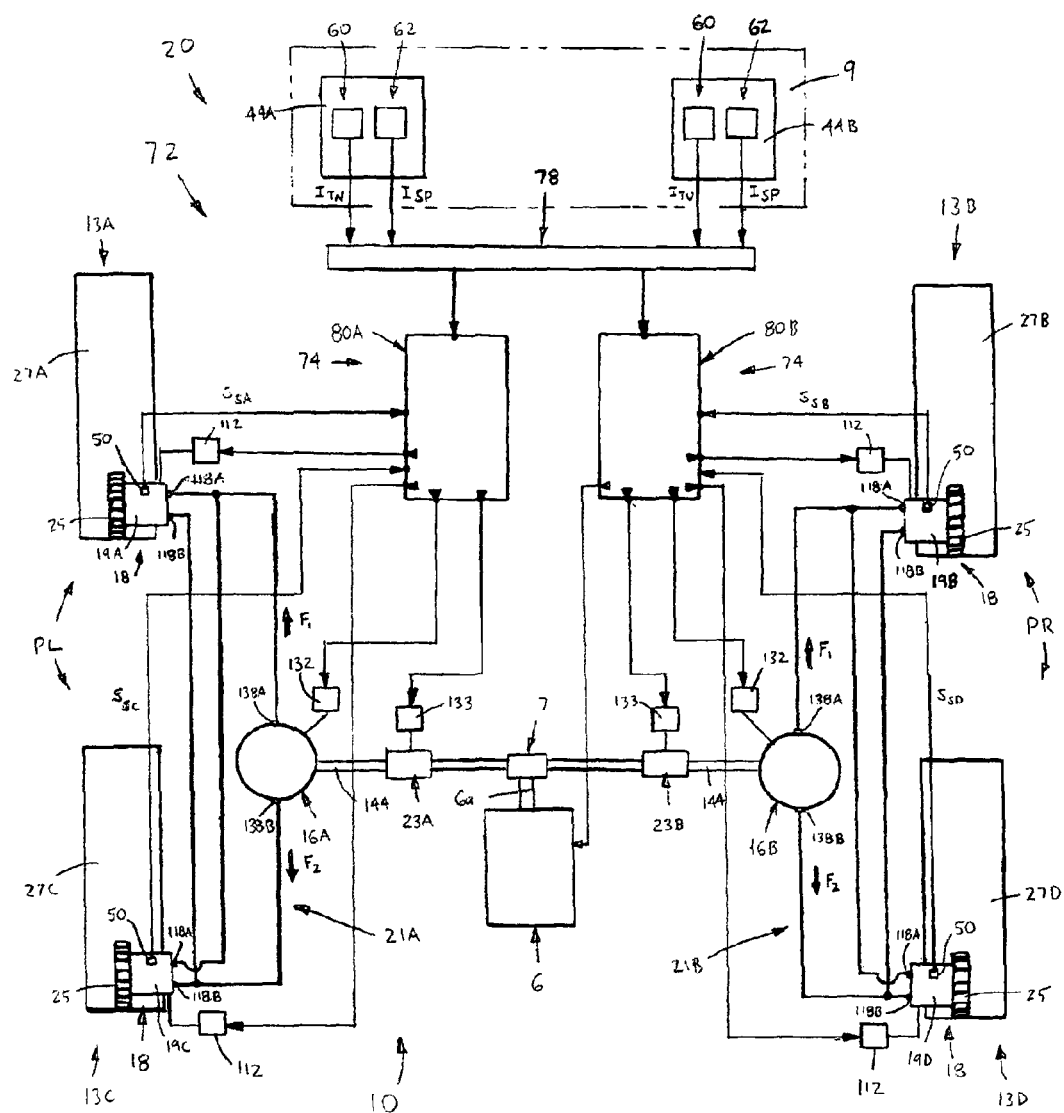
FIG. 21 is a modified schematic view of a preferred propel control, shown connected with the pumps and crawler assembly motors
Figure 22:
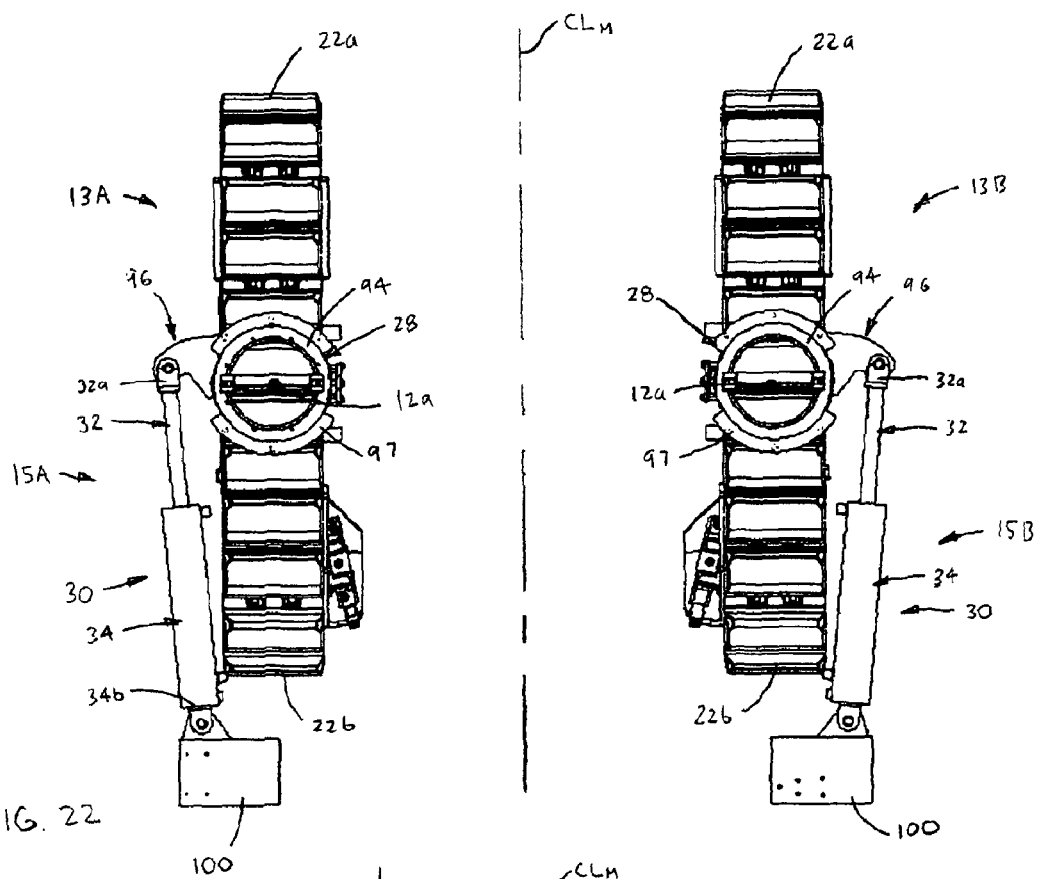
FIG. 22 is a top plan view of a front pair of crawler assemblies and two front steering actuators.

Referring to FIGS. 7 and 21, the first and second pumps 16A, 16B are preferably arranged such that the first or "left" pump 16A is fluidly coupled with the motors 19A, 19C of the left pair PL of crawler assemblies 13A, 13C and the second or "right" pump 16B is fluidly coupled with the motors 19B, 19D of the right pair PR of crawler assemblies 13B, 13D. Most preferably, each one of the pumps 16A, 16B and the two motors 19A/19C or 19B/19D coupled with each pump 16A, 16B, respectively, are fluidly connected in a closed hydraulic circuit 21A, 21B, respectively, such that fluid flow out of each pump 16A or 16B flows into each of the two coupled motors 18 and fluid flow out the two motors 18 flows directly into the coupled pump 16A, 16B, as described in greater detail below. However, although not presently preferred, the pumps 16A, 16B and the motors 18 may alternatively fluidly coupled in an "open" circuit, such that fluid flow out of the motors 18 flows to a fluid reservoir (not shown) from which the pumps 16A or 16B draws fluid. Further, each pump 16A, 16B is configured to direct hydraulic fluid to each one of coupled motors 18 so as to drive the two motors 18 alternatively in forward and reverse directions $f_m$, $r_m$, so as to thereby respectively drive the coupled track 26 in the track forward and reverse directions $T_F$, $T_R$, as described above. Additionally, each pump 16A, 16B is adjustable to vary a rate of fluid flow $R_{FH}$ from the pump 16A, 16B to the coupled motors 18, so as thereby vary the speed of the motors 18 and thus the driven crawler track 26, as discussed in detail below.

Furthermore, the milling machine 1 preferably an engine 6, preferably a diesel engine 6, mounted on the mainframe 2 and configured to drive the two pumps 16A, 16B, among other machine components. Specifically, the engine 6 has a rotatable output shaft 6a that is connected with the input shaft 144 (described below) of each pump 16A, 16B through a main transmission 7 and two pump drive transmissions 23A, 23B. The pump drive transmissions 23A, 23B are each connected with the main transmission 7 and operatively connected with a separate one of the pump input shafts 144 so as to vary the rotational speed of the associated pump shaft 144. Further, the main transmission 7 is preferably adjustable to vary the pump shaft speed, and thereby pump flow rate $R_{FH}$, as discussed below.

Referring to FIGS. 3, 6, 7, 16, 20 and 21, the control 20 is configured to separately operate each steering actuator 14 such that each crawler assembly 12 is independently angularly positionable about the associated crawler axis 12a. Specifically, the control 20 operates the solenoids (not shown) controlling flow through each of the preferred cylinders 30 so as to retract and/or extend each cylinder 30 to displace the connected crawler frame 22 to a desired angular position $AP_N$, as determined by monitoring rod position using the above-described sensors 36. The control 20 is also configured to operate the two pumps 16A, 16B and/or the four crawler motors 18 such that each crawler track 26 is driven at a desired-speed TS, which may be substantially the same as or substantially different than, the other three crawler tracks 26, as described in detail below. Preferably, the control 20 is configured to selectively operate the four actuators 14, in conjunction with the pumps 16A, 16B and/or the motors 18, in a plurality of different steering modes $MS_N$, each being described n detail below. Further, the control 20 preferably operates all the steering actuators 14 generally simultaneously, such that the desired positioning of the crawler assemblies 12 in each below-described steering mode $MS_N$ occurs substantially simultaneously, but may occur in two or more successive movement steps or stages if desired.

Referring first to FIGS. 8A and 8B, one of the steering modes $M_N$ is a circle steer mode $MS_{CS}$ in which the control 20 directs the four actuators 14 such that the steering actuators 15A, 15D each angularly displaces the front left and rear right crawler assemblies 13A, 13D, respectively, in the first angular direction $A_1$ about its vertical axis 12a. Preferably generally simultaneously (but alternatively previously or subsequently), the control 20 also directs the steering actuators 15B, 15C to angularly displace each of the front right and rear left crawler assembly 13B, 13C, respectively, in the second, opposing direction $A_2$ about its axis 12a. When the four steering actuators 14 have angularly displaced the four crawler assemblies 12 to execute the circle steer mode $M_{CS}$, the four crawlers 12 are arranged in a generally diamond-like pattern. Specifically, the front pair PF of crawler assemblies 13A, 13B are positioned such that the centerlines $CL_F$ of the two front crawler assembly frames 22 are generally converging forwardly of the mainframe 2, while the back pair PB of crawler assemblies 13C, 13D are positioned such that the centerlines $CL_F$ of the two rear crawler assembly frames 22 are generally converging rearwardly of the mainframe 2, as best shown in FIG. 8A.

Further, by having two pumps 16A, 16B each separately fluidly connected with two of the four crawler assembly motors 18, specifically the two motors 18 of one of the left and right pairs PL, PR of crawler assemblies 12, the control 20 is able to drive these crawler pairs PL, PR in opposite directions. That is, the control 20 is configured to operate the two pumps 16A, 16B such the two motors 18 of the left pair PL of crawler assemblies 13A, 13C are drivable or driven by the first pump 16A in one of the forward and reverse directions $f_m$ or $r_m$ while the two motors 18 of the right pair of crawler assemblies 13B, 13D are drivable/driven by the second pump 16B in the other one of the forward and reverse directions $f_m$, $r_m$. With this capability, the control 20 is further configured to operate the motors 18 when in the circle steer mode $M_{CS}$ such that the crawler track 26 of one of the front pair PF of crawler assemblies 13A, 13B is rotated in the first or forward angular direction $T_F$ and the track 26 of the other one of the front pair of crawler assemblies 13B, 13A is rotated in the second, reverse direction $T_R$. Also, the tracks 26 of the rear crawler assemblies 13C, 13D are driven in the same direction $T_F$ or $T_R$ as the front crawler 13A, 13B proximal to the same mainframe side 2c, 2d.

In other words, the left pair LP of crawler assemblies 13A, 13C are drivable in one of the angular directions $T_F$ or $T_R$ while the right pair RP of crawler assemblies 13B, 13D are generally simultaneously driven in the other or opposite direction $T_R$, $T_F$. As such, the mainframe 2 is angularly displaced or rotated generally about the mainframe center C while the center C remains generally at a fixed position on a base surface S. Specifically, when the left front and rear crawler assemblies 13A, 13C are driven in the forward direction $T_F$ and the right front and rear crawler assemblies are driven rearward direction $T_R$, the main frame 2 rotates in the first angular direction $A_1$ about the center C (not shown). Alternatively, when the left front and rear crawler assemblies 13A, 13C are driven in the rearward direction $T_R$ and the right front and rear crawler assemblies 13B, 13D are driven forward direction $T_F$, the main frame 2 rotates in the second angular direction $A_2$ about the center C, as shown in FIG. 8B.

As the mainframe 2 rotates or turns about its center C without any substantial linear displacement of the center C, the circle steer mode $MS_C$ enables the machine 1 to be turned in either lateral direction L, R, or even reversed, within a minimal turning radius. Such a steering mode $MS_{CS}$ is enabled by having four actuators 14 separately angularly displacing or "turning" each crawler assembly 12 and two pumps 16A, 16B capable of driving the left and right crawler pairs PL, PR in opposing directions.

Figure 9B:
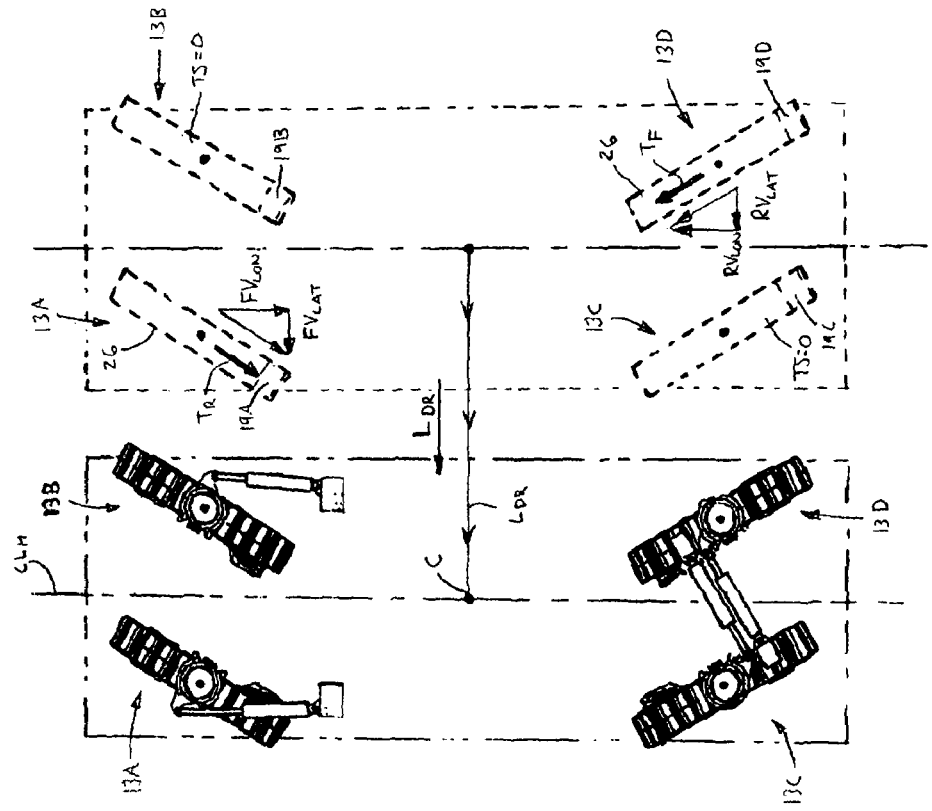
FIG. 9B is another top plan view of the crawler assemblies and steering actuators of FIG. 9A, shown after displacement in the drum removal mode $MS_{DR}$ and with the initial position in phantom.
Figure 9A:
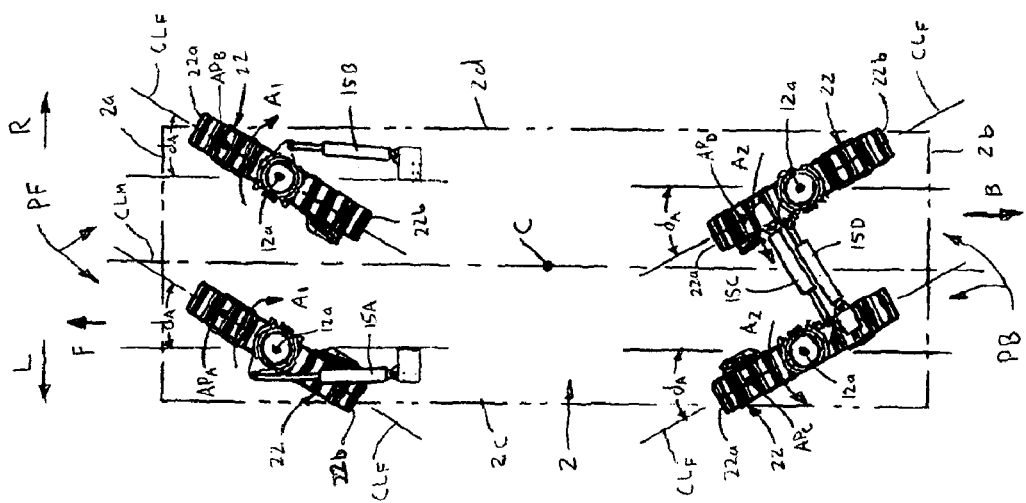
FIG. 9A is a top plan view of the crawler assemblies and steering actuators as positioned in a drum removal mode $MS_{DR}$.

Referring to FIGS. 9A and 9B, the control 20 is also configured to operate the four crawler assemblies 12 in a "drum removal" steering mode $MS_{DR}$, which enables the milling machine 1 to displace in a desired or selected lateral direction L or R without turning the main frame 2 about the center C. When operating in the drum removal mode $MS_{DR}$, the control 20 directs the two front steering actuators 15A, 15B to angularly displace the front pair of crawler assemblies 13A, 13B in one angular direction $A_1$ or $A_2$ and directs the two rear steering actuators 15B, 15D to angularly displace the rear pair of crawler assemblies 13C, 13D in the other, opposing angular $A_2$, $A_1$, respectively. The particular displacement direction $A_1$ or $A_2$ of the front and rear crawler assemblies 13A, 13B, 13C, 13D is determined so as to move the rear ends 22b of the two front crawler frames 22 and the front ends 22a of the two rear crawler frames 22 generally in the desired/selected direction L, R of machine displacement. In other words, to displace the mainframe 2 in the left direction L as depicted in FIG. 9B, the front crawlers 13A, 13B are rotated in the first direction $A_1$ so that their frame rear ends 22b move toward the main frame left side 2c while the rear crawler assemblies 13C, 13D are rotated in the second direction $A_2$ so that their frame front ends 22a move toward the mainframe left side 2c, and vice-versa.

After angular displacement of the crawlers 12 as described, the control 20 then directs the motor 18 of the one front crawler assembly 13A or 13B proximal to the frame side 2c or 2d in the desired displacement direction L or R, respectively, so as to drive the coupled crawler track 26 in the rearward direction $T_R$ and thus generally toward the frame center C, while the other front crawler assembly 12 (i.e., the one proximal to the side 2c, 2d away from desired movement) is non-driven. That is, when the operator wishes to drive the machine 1 to displace in the left lateral direction L, the control 20 directs the front left crawler assembly 13A to drive its track 26 generally rearwardly, while the front right crawler assembly 13B remains generally idle, and vice versa. Generally simultaneously, the control 20 also directs the motor 18 of the rear crawler assembly 13C, 13D diagonally opposite to driven front crawler assembly 13A or 13B, i.e., proximal to the mainframe side 2d, 2c opposite or "away from" the desired displacement direction L or R, to drive its track 26 in the forward direction $T_F$ generally toward the center C, while the other rear crawler assembly 12 is non-driven. That is, when the front left crawler 13A is driven to displace the machine frame 2 in the left direction L as depicted, the control 20 simultaneously drives the rear right crawler assembly 13D while the rear left crawler assembly 13C remains generally idle, and vice versa.

With the tracks 26 of two diagonally opposing crawler assemblies 13A and 13D, or 13B and 13C, each being driven toward the center C, the machine mainframe 2 is caused to displace in the desired lateral direction L or R with substantially no longitudinal displacement of the frame 2 or angular displacement about the frame center C, such that the frame center C moves a along a generally straight path $L_{DR}$. This effect is due to the cancellation of the longitudinal components $FV_{LON}$, $RV_{LON}$ of the rearwardly driven front crawler assembly 13A or 13B and the frontwardly driven rear crawler assembly 13D, 13C, respectively, while the lateral components $FV_{LAT}$, $RV_{LAT}$ of the velocity of the two driven crawlers 12 both act in the same direction, i.e., the desired displacement direction L or R. Thus, the drum removal mode $MS_{DR}$ enables the mainframe 2 to generally linearly displace in one of two lateral directions L or R (i.e., "sideways") without any turning about the center C. As such, the milling machine 1 may be moved away from or "off of" a disconnected cutter drum 3 to enable access to the drum 3 for maintenance or replacement thereof.

As discussed above, the circle steer mode $MS_{CS}$ and the drum removal mode $MS_{DR}$ are enabled by having the separately steerable crawler assemblies 12 and/or the separately drivable left and right pairs PL, PR of crawler assemblies 13A/13C and 13B/13D. However, the control 20 is also configured to operate the steering actuators 14, and the pumps 16A, 16B and/or motors 18, in the following, more conventional steering modes $MS_N$, as follows.

Referring now to FIGS. 10A and 10B, in a front steer mode $MS_{FS}$, the control 20 directs the two front steering actuators 15A, 15B to angularly displace the two front crawler assemblies 13A, 13B in the same selected one of the first and second directions $A_1$ or $A_2$ about its vertical axis $12a$ and by about the same angular displacement $d_A$. The rear crawler assemblies 13C, 13D remain disposed or arranged such that the frame centerlines $CL_F$ extend generally with the mainframe centerline $CL_M$, i.e., the rear assemblies 13C, 13D do not turn. As such, when the control 20 operates the four crawler motors 18 such that all four crawler tracks 26 are driven in the same direction $T_F$ or $T_R$, the mainframe 2 both linearly displaces generally forwardly or rearwardly and angularly displaces about the frame center C in one of two lateral directions L, R, such that the frame center C moves along a generally curved path $L_{FS}$, as indicated in FIG. 10B.

More specifically, when the front steering actuators 15A, 15B rotate the front crawler assemblies 13A, 13B in the first, clockwise direction $A_1$, the mainframe 2 will both turn toward the right lateral direction R and displace generally in the forward direction F when all four crawler tracks 26 are driven in the forward direction $T_F$ (as depicted), and will alternatively both turn toward the left direction L and displace generally in the reverse direction B when all four crawler tracks 26 are driven in the reverse direction $T_R$. Further, when the front steering actuators 15A, 15B rotate the front crawler assemblies 13A, 13B in the second, counter-clockwise direction $A_2$, the mainframe 2 will both turn toward the left lateral direction L and displace generally in the forward direction F when all four crawler tracks 26 are driven in the forward direction $T_F$, and will alternatively both turn toward the right direction R and displace generally in the reverse direction B when all four crawler tracks 26 are driven in the reverse direction $T_R$.

Furthermore, it must be noted that when turning about the mainframe center C in either lateral direction L or R, the lateral pair PL, PR of crawlers 12 opposite the "turning direction" (i.e., the right pair PR when turning in the left direction L and the left pair PL when turning in the right direction R) must rotate at a greater speed than the pair of crawlers PR, PL in the turning direction in order to negotiate the turn, as has long been known in the art of wheeled or tracked vehicles. As such, the control 20 is preferably configured to drive the "outer" pair PR, PL of crawlers 12 opposite the turning direction L or R, respectively, at a proportionally greater speed than the "inner" pair PL, PR of crawlers 12 so that the milling machine 1 is able to generally rotate or turn about a turning center TC, as indicated in FIG. 10B. The control 20 similarly drives the lateral crawler pairs PL, PR at proportional speed rate when the mainframe 2 is turned in other steering modes $MS_N$ described below.

Figure 11B:
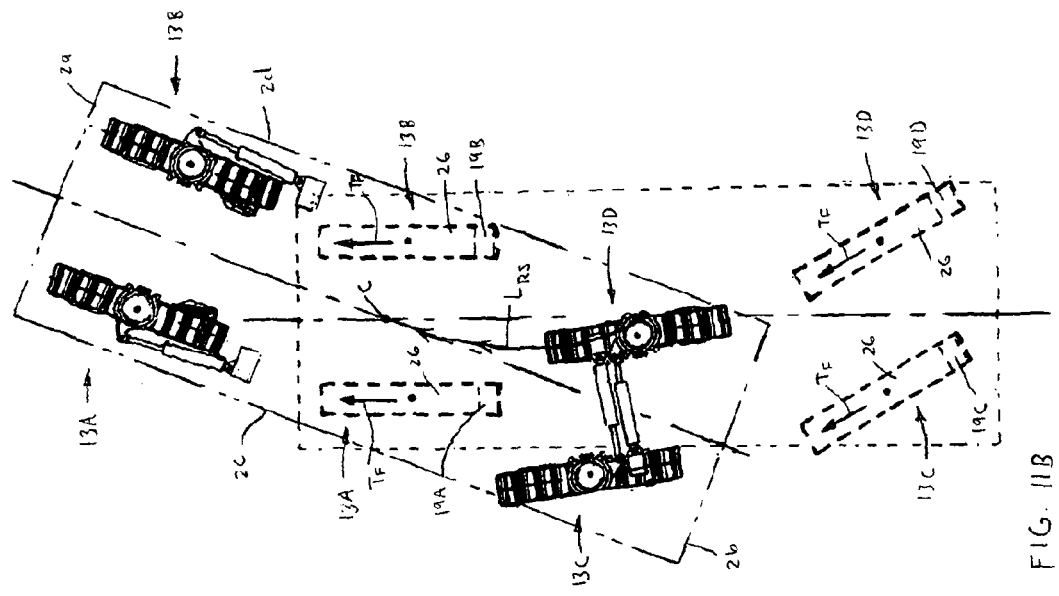
FIG. 11B is another top plan view of the crawler assemblies and steering actuators of FIG. 11A, shown after displacement in the rear steer mode $MS_{RS}$ and with the initial position in phantom.
Figure 11A:
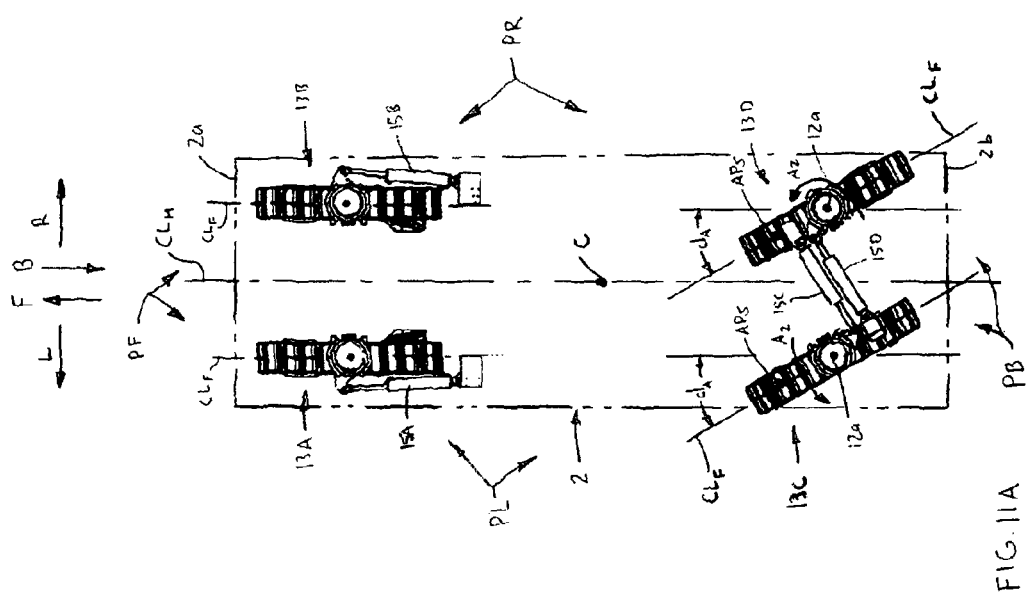
FIG. 11A is a top plan view of the crawler assemblies and steering actuators as positioned in a rear steer mode $MS_{RS}$.

Similarly, in a rear steer mode $MS_{RS}$ shown in FIGS. 11A and 11B, the control 20 directs the two rear steering actuators 15C, 15D to angularly displace the two rear crawler assemblies 13C, 13D in the same one of the first and second directions $A_1$ or $A_2$ about their vertical axes 12a and by about the same angular displacement $d_A$. The front crawler assemblies 13A, 13B remain disposed with their frame centerlines $CL_F$ extending generally along the mainframe centerline $CL_M$ (i.e., the front crawler assemblies 13A, 13B do not turn). As such, when the control 20 operates the four crawler motors 18 such that all four crawler tracks 26 are driven in the same direction $T_F$ or $T_R$, the mainframe 2 both linearly displaces generally forwardly or rearwardly and angularly displaces about the frame center C in one of two lateral directions L, R, such that the frame center C moves a along a generally curved path $L_{RS}$, but turned in a manner opposite the front steer mode $MS_{FS}$. More specifically, when the rear steering actuators 15C, 15D rotate the rear crawler assemblies 13C, 13D in the first, clockwise direction $A_1$, the mainframe 2 will both turn toward the left lateral direction L and displace generally in the forward direction F when all four crawler tracks 26 are driven in the forward direction $T_F$, and will alternatively both turn toward the right direction R and displace generally in the reverse direction B when all four crawler tracks 26 are driven in the reverse direction $T_R$. Further, when the rear steering actuators 15C, 15D rotate the rear crawler assemblies 13C, 13D in the second, counter-clockwise direction $A_2$, the mainframe 2 will both turn toward the right lateral direction R and displace generally in the forward direction F when all four crawler tracks 26 are driven in the forward direction $T_F$ (as depicted in FIG. 11B), and will alternatively both turn toward the left direction L and displace generally in the reverse direction B when all four crawler tracks 26 are driven in the reverse direction $T_R$.

Figure 12B:
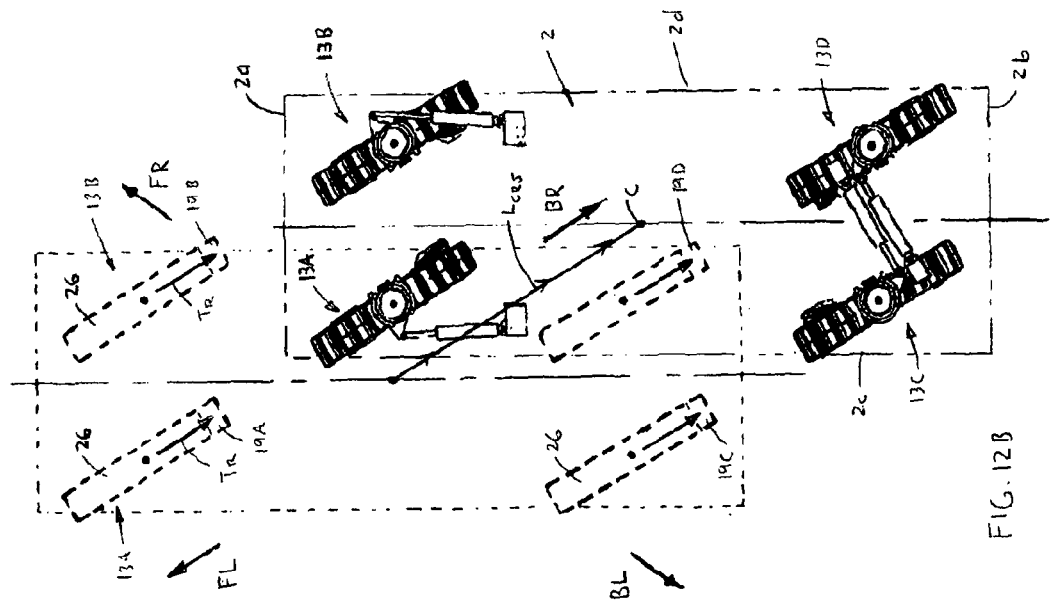
FIG. 12B is another top plan view of the crawler assemblies and steering actuators of FIG. 12A, shown after displacement in the crab steer mode $MS_{CRS}$ and with the initial position in phantom.
Figure 12A:
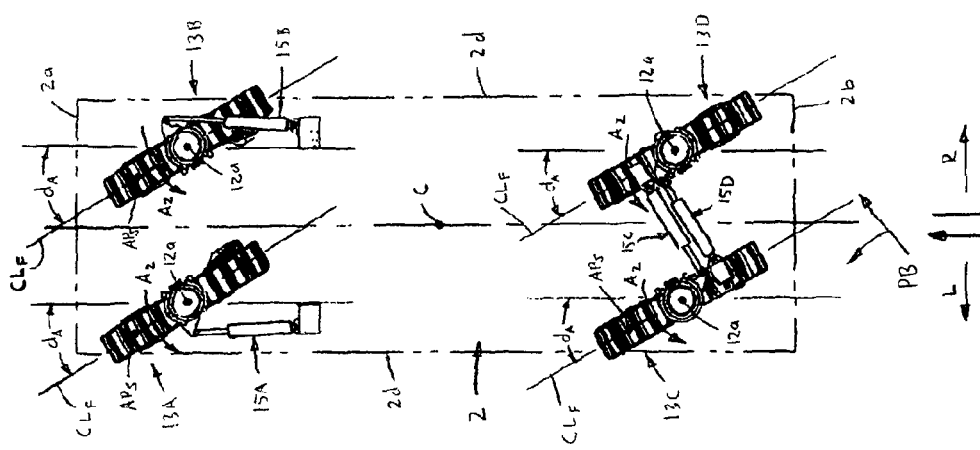
FIG. 12A is a top plan view of the crawler assemblies and steering actuators as positioned in a crab steer mode $MS_{CRS}$.

Referring to FIGS. 12A and 12AB, in a crab steer mode $MS_{CRS}$, the control 20 directs all four steering actuators 14 to angularly displace all four crawler assemblies 12 by about the same angular displacement $d_A$ and in the same one of the first and second directions $A_1$ or $A_2$ and about their respective vertical axes 12a. Thereafter, when the control 20 operates the four crawler motors 18 to drive the tracks 26 in the same direction $T_F$ or $T_R$, the mainframe center C linearly displaces in an angled direction extending both generally toward either the front or rear mainframe ends 2a or 2b and generally toward either the left or right mainframe sides 2c or 2d (i.e., front-left, front-right, rear-left, or rear-right (as shown)), without rotation of the frame 2 about the center C. More specifically, when the steering actuators 14 rotate all of the crawler assemblies 12 in the first, clockwise direction $A_1$, the mainframe 2 moves in a front-right direction FR when the crawler tracks 26 are all driven in the forward direction $T_F$ and alternatively moves in a rear-left direction BL when the crawler tracks 26 are driven in the reverse direction $T_R$. Further, when the steering actuators 14 rotate all of the crawler assemblies 12 in the second, counter-clockwise direction $A_2$, the mainframe 2 moves in a front-left direction FL when all the crawler tracks 26 are driven in the forward direction $T_F$ and alternatively moves in a rear-right direction BR when the crawler tracks 26 are driven in the reverse direction $T_R$, as depicted in FIG. 12B. As such, the crab steer mode $MS_{CRS}$ enables the milling machine 1 to be displaced in a lateral direction L or R without turning the machine 1 about its center C, so that the mainframe 2 remains oriented in a particular direction (i.e., both before and after performing a crab steer operation).

As shown in FIGS. 13A and 13B, in a coordinated steer mode $MS_{COS}$, the control 20 directs the two front steering actuators 15A, 15B to angularly displace the two front crawler assemblies 13A, 13B in the same one of the first and second directions $A_1$, $A_2$ about the crawler vertical axes 12a and also directs the two rear steering actuators 15C, 15D to angularly displace the two rear crawler assemblies 13C, 13D in the other one of the first and second directions $A_1$, $A_2$ about the crawler vertical axes 12a. As such, when the control 20 thereafter operates the four crawler motors 18 to displace the coupled tracks 26 in the same direction $T_F$ or $T_F$, the mainframe 2 both linearly displaces generally forwardly or rearwardly and angularly displaces about the frame center C in one of two lateral directions L, R, such that the frame center C moves along a generally curved path $L_{COS}$.

That is, when the control 20 directs the front steering actuators 15A, 15B to rotate the front crawler assemblies 13A, 13B in the first direction $A_1$ and directs the rear steering actuators 15C, 15D to rotate the rear crawler assemblies 13C, 13D in the second direction $A_2$, the mainframe 2 moves generally forwardly and in the right lateral direction R when the tracks 26 are driven in the forward direction $T_F$, such that the mainframe front end 2a "faces" the right direction R (as depicted in FIG. 13B). Alternatively, with the crawler 12 so positioned, the mainframe 2 moves generally rearwardly and in the right lateral direction R when the tracks 26 are driven in the reverse direction $T_R$, such that the mainframe front end 2a faces the left direction L. Further, when the front steering actuators 15A, 15B rotate the front crawler assemblies 13A, 13B in the second direction $A_2$ and the rear steering actuators 15C, 15D rotate the rear crawler assemblies 13C, 13D in the first direction $A_1$, the mainframe 2 moves generally forwardly and in the left direction L when the tracks 26 are driven in the forward direction $T_F$, such that the mainframe front end 2a faces the left direction L. And when the tracks 26 are alternatively driven in the reverse direction $T_R$ with the crawlers 12 so positioned, the mainframe 2 moves generally rearwardly and in the left lateral direction L such that the mainframe front end 2a faces the right direction R.

Referring to FIGS. 14A and 14B, in a curb pullaway mode $MS_{CPA}$, the control 20 directs the steering actuators 14 to displace all four crawler assemblies 12 in the same angular direction $A_1$ or $A_2$, but separately directs each lateral pair PL, PR to displace through a different angular displacement $d_{AL}$, $d_{AR}$, respectively, the angular displacement being greater for the crawler pair PL, PR in the direction L, R of desired machine movement. Specifically, to displace the mainframe 2 in the left direction L and forwardly, all four actuators 14 displace the coupled crawler assemblies 12 in the second direction $A_2$, but the left steering cylinders 15A, 15C displace the left crawler pair PL through an angular displacement $d_{AL}$ that is greater than the angular displacement $d_{AR}$ of the right pair PR of crawler assemblies 13B, 13D by the right steering cylinders 15B, 15D, as shown in FIG. 14A. Then, when the control 20 directs all four motors 18 to drive the crawler tracks 26 in the forward direction $T_F$, the mainframe center C displaces forwardly and toward the left in a curved path $L_{CP}$, as depicted in FIG. 14B. Alternatively, to displace the mainframe 2 in the right direction R and forwardly, all four actuators 14 displace the coupled crawler assemblies 12 in the first direction $A_1$, with the right crawler assembly pair PR being moved through an angular displacement $d_{AR}$ greater than the angular displacement $d_{AL}$ of the left crawler assembly pair PL, and then all four crawler tracks 26 are driven in the forward direction $T_F$. Similarly, to displace the crawler assemblies 12 rearwardly in the curb pullaway mode $MS_{CPA}$, the crawler assemblies 12 are either rotated in the first direction $A_1$ with the left crawler pair PL moved through a greater angular displacement $d_{AL}$ to move in the left direction L, or rotated in the second direction $A_2$ with the right crawler pair PR displaced by a greater angular displacement $d_{AR}$ to move in the right direction R, with all four crawler tracks 26 being driven in the reverse direction $T_R$ in both cases.

The curb pullaway mode $MS_{CPA}$ is clearly beneficial when desiring to move the milling machine 1 away from a curb or other obstruction located on the side L or R away from which the crawler assemblies 12 are displaced. In other words, when the milling machine 1 is located, for example, adjacent to a road curb RC, the amount of angular displacement of left or right pair PL, PR of crawler assemblies 12 located proximal to the curb is limited by potential contact with the curb RC, but the other pair PR, PL of crawler assemblies 12 are freely or fully angularly displaceable. Thus, by having the ability to rotate the "outer" pair PL or PR of crawlers 12 (i.e., on the frame side 2c, 2d away from the obstruction) through a greater displacement, the mainframe 2 is able to move a greater lateral distance away from a curb/obstruction for a given amount of longitudinal displacement (forward or reverse) as compared with having both crawler pairs PL, PR being limited to the same, lesser angular displacement.

Referring now to FIGS. 15-21, the propulsion and steering system 10 preferably further comprises a steering mode selector device 40 operatively coupled with the control 20 and configured to selectively adjust the control 20 between each one of the at least two steering modes $MS_N$. The mode selector device 40 includes at least one user input member 42 manipulable by a milling machine operator to select a desired one of the steering modes $MS_N$. Preferably, the mode selector device 40 includes a plurality of user input members, most a combination of switches or pushbuttons 43N mounted on a control panel 44 and a "region" of a touch screen display 48 on the panel 44, which are each configured to generate a steering mode input $I_{MS}$ corresponding to a separate one of the steering modes $MS_N$. More specifically, the control panel 44 preferably includes five switches 43A-43E, which respectively initiate the front steer mode $MS_{FS}$, the rear steer mode $MS_{RS}$, the coordinated steer mode $MS_{COS}$, the crab steer mode $MS_{CRS}$, the circle steer mode $MS_{CS}$, and the display 48 has at least one touch screen region (not indicated) for initiating the curb pullaway mode $MS_{CPA}$ and the drum removal mode $MS_{DR}$. Further, each push button 43A-43E is electrically connected with the control 20 and is activateable (i.e., by "pushing") to generate the steering mode input $I_{MS}$ and to transmit the input $I_{MS}$ to the control 20. Also, the touch screen region(s) of the display 48 are operatively coupled with the control 20 by software, as is well known in the electronic control arts.

Figure 20:
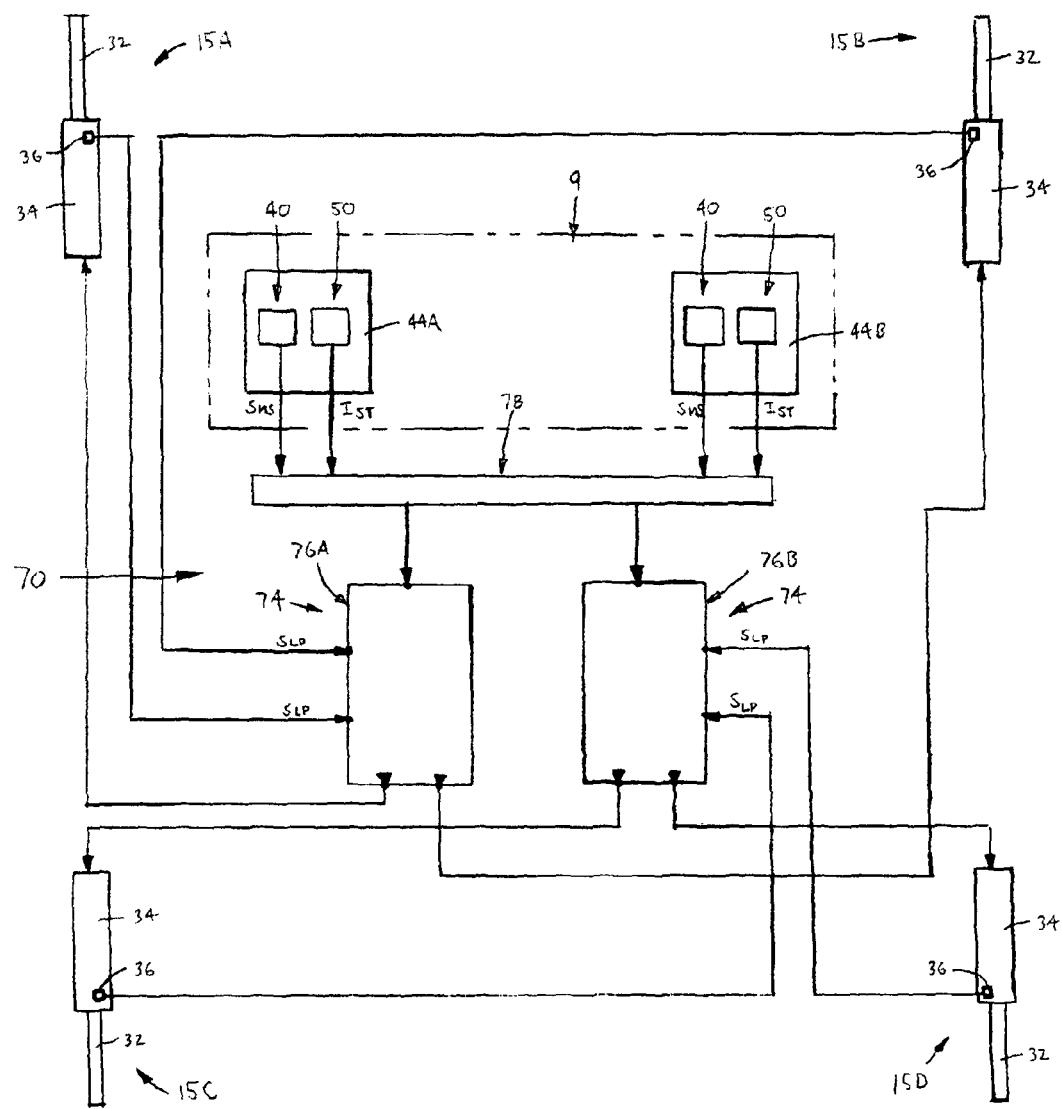
FIG. 20 is a modified schematic view of a preferred steer control, shown connected with the steering actuators and sensors.

Although a plurality of separate buttons 43 is presently preferred, the steering mode selector device 40 may alternatively be constructed in any other appropriate manner. For example, the steering selector device 40 may include only a single knob (not shown) rotatable to a plurality of angular positions (i.e., seven positions) each corresponding to a desired steering mode input. Further, as depicted in FIG. 20, the steering and propulsion system 10 preferably includes left and right control panels 44A, 44B, each including a separate steering mode selector device 40, and all other operator control devices as discussed above and further below. As such, a machine operator may fully operate the milling machine from either control panel 44A or 44B.

Furthermore, at least one indicator device 45 is coupled with the control 20 and configured to provide at least at least one mode indication, preferably a separate indication when the control 20 is in each steering mode $MS_N$. Most preferably, the control 20 includes an input controller 46 and a graphic display 48 connected with the steer control 70. The input controller 46 is configured to receive the steering mode input $I_{MS}$ from the preferred pushbuttons 43, to transmit a mode command signal $s_{MS}$ to a steer control 70 (as depicted) and propel control 72, as described below, and to transmit a mode indicator signal $s_{MI}$ to the display 48. The graphic display 48 receives the mode indicator signals and generates one of plurality of unique, visual or graphic indications $IN_N$ (i.e., $IN_1$, $IN_2$ . . . , or $IN_7$) each corresponding to a separate one of the seven preferred steering mode $MS_N$, as described above.

With this structure, when a machine operator pushes one of the preferred mode pushbuttons 43 corresponding to a desired steering mode $MS_N$, the button 43 transmits a unique input signal $I_{MS}$ to the input controller 46. The input controller 46 then transmits a corresponding command signal $s_{MS}$ to the steering control 70 and the propel control 72, such that the steering control 70 appropriately directs the steering actuators 14 and the propel control 72 directs the pumps 16A, 16B and the motors 18 as appropriate for the selected steering mode $MS_N$, as described above and in further detail below. Generally simultaneously, the input controller 46 also send an appropriate mode indicator signal $S_{1N}$ to the graphic display 48, such that the display 48 provides a unique graphic indication to enable the operator (or other persons) to determine in which particular steering mode $MS_N$ the control 20 is currently operating.

Still referring to FIGS. 15-21, the propulsion and steering system 10 preferably further comprises an operator steering device 50 operatively coupled with the control 20 and configured to provide at least first and second steering inputs $I_{S1}$, $I_{S2}$ into the control 20, preferably the propel controller 72 as discussed above and in detail below. The control 20 is further configured to direct at least two of the four steering actuators 14, depending on the particular steering mode $MS_N$, to each angularly displace its coupled crawler assembly 12 in either the first or second angular directions $A_1$, $A_2$. Specifically, the control 20 directs each steering actuator 14 to displace the coupled crawler 12 in the first angular direction $A_1$ when the control 20 receives the first input $I_{S1}$ and to alternatively direct the steering actuator 14 to angularly displace the coupled crawler assembly 12 in the second angular direction $A_2$ when the control 20 receives the second input $I_{S2}$. Preferably, the steering device 50 includes a steering member 52 moveable between first and second limit positions $W_L$, $W_R$ to provide the inputs $I_1$, $I_2$ to the control 20. That is, the steering member 52 is configured to provide the first input $I_{S1}$ to the control 20 when the steering member 52 is moved toward the first limit position $W_L$ and to provide the second input $I_{S2}$ to the control 20 when the steering member 52 is moved toward the second limit position $W_R$.

Figure 17:
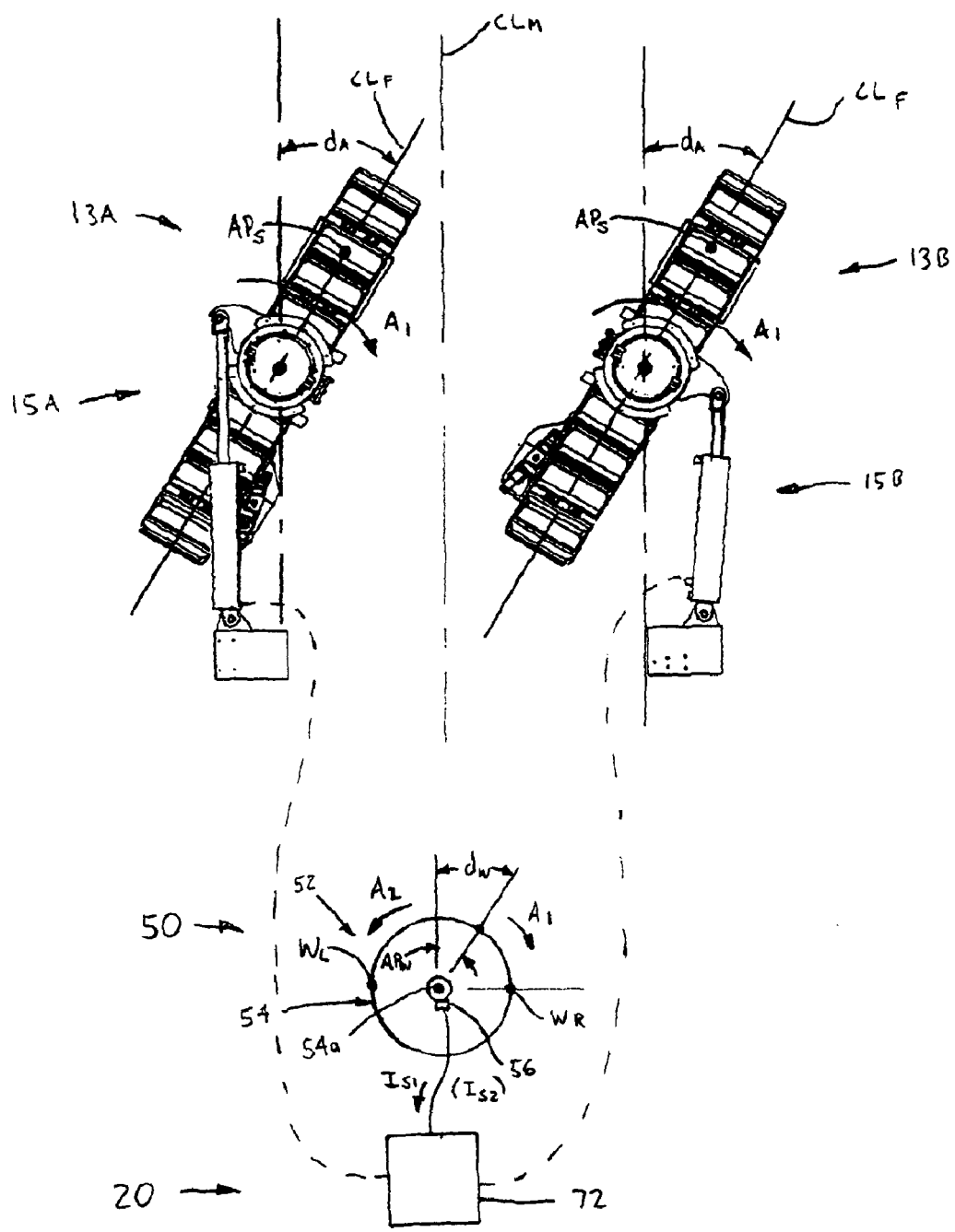
FIG. 17 is a more diagrammatic view of a steering device, showing only the front crawler assemblies for purposes of illustration.
Figure 1B:
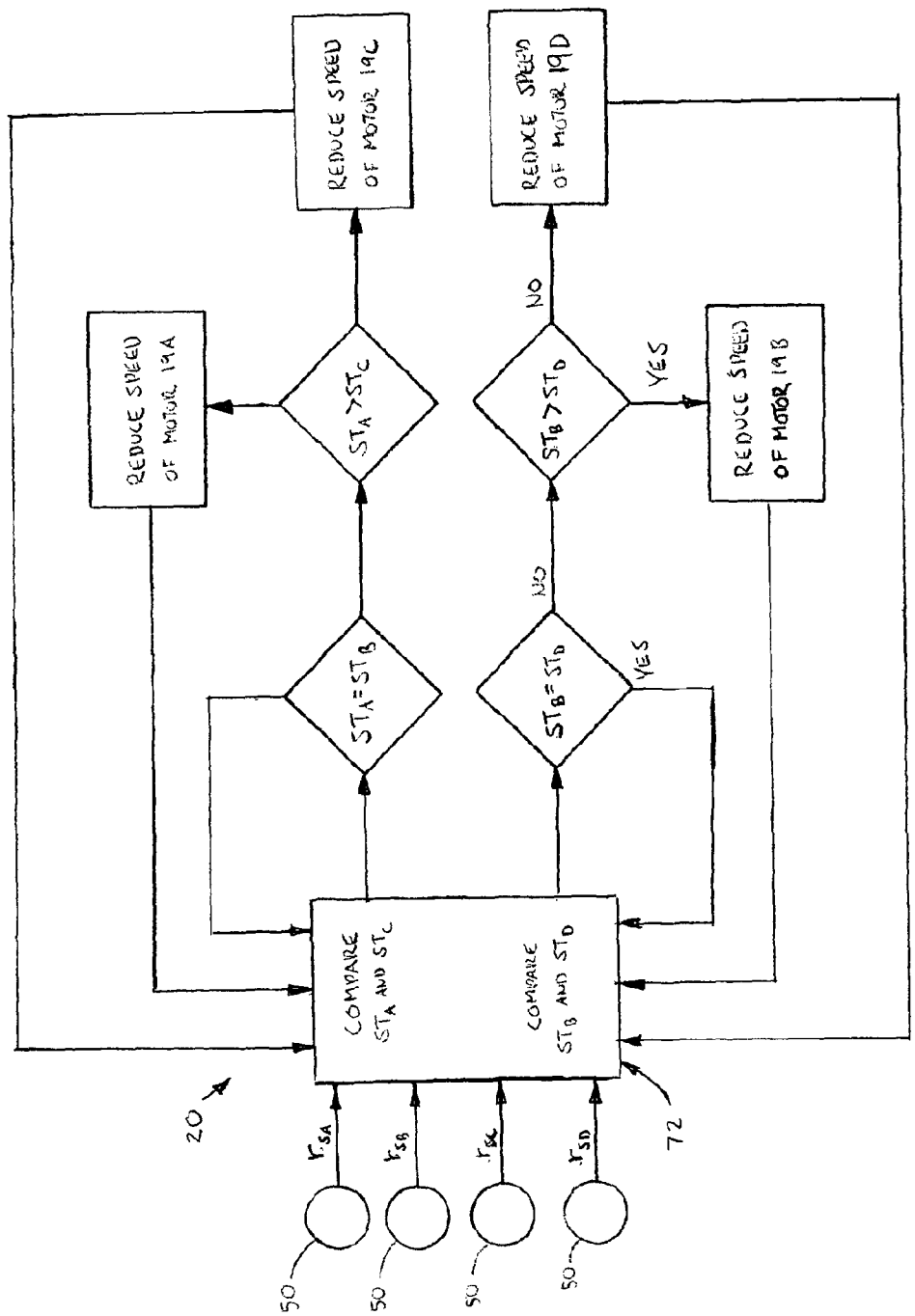

Most preferably, the steering member 52 includes a steering wheel 54 rotatable between the two limit positions $W_L$, $W_R$ in opposing directions $A_1$, $A_2$ about a steering axis 54a. Further, the steering device 50 also includes a position sensor 56 coupled with the control 20 and configured to sense an angular position $AP_W$ of the steering member 52 about the steering axis 54a. As best shown in FIG. 17, with such a steering input structure, the control 20 is configured to angularly displace the at least two crawler assemblies 12 to an angular position $AP_S$ about each crawler axis 12a at least generally corresponding with the steering member angular position $AP_W$, either directly corresponding or inversely corresponding. In other words, the control 20 directs each steering actuator 14 to either displace the coupled crawler assembly 12 in the same direction $A_1$ or $A_2$ as the steering wheel 54 (e.g., when turning in the front steer mode $MS_{FS}$) or to move in the direction $A_2$, $A_1$ opposite the direction $A_1$, $A_2$ of steering wheel rotation (e.g., when rotating the rear crawlers 13C, 13D in the coordinated steer mode $MS_{CS}$). Further, in the front steer mode $MS_{FS}$, the rear steer mode $MS_{RS}$, the crab steer mode $MS_{CRS}$, and the coordinated steer mode $M_{COS}$, the control 20 is configured to direct each steering actuator 14 functioning in the particular steering mode $MS_N$ to angularly displace its coupled crawler assembly 12 through an angular displacement $d_A$ that is substantially equal to the angular displacement $d_W$ of the steering wheel 54, as depicted in FIG. 17. Further, in the curb pullaway mode $MS_{CPA}$, the control 20 is preferably configured to direct the steering actuators 14 coupled with the crawler pair PL or PR in the direction of lateral displacement to rotate the crawlers 12 through an angular displacement substantially equal to the angular displacement of the steering wheel 54, but only rotates the other crawler pair PR, PL through a portion of the wheel displacement (e.g., ⅓ or ¼ of the wheel displacement).

However, in both the circle steer mode $M_{CS}$ and the drum removal mode $MS_{DR}$, the control 20 is preferably configured to direct the steering actuators 14 to displace the crawler assemblies 12 by a specific angular displacement, and thus to a particular angular position $AP_N$ (i.e., $AP_A$, $AP_B$, $AP_C$ and/or $AP_D$) regardless of the steering wheel displacement/position. Specifically, in the circle steer mode $M_{CS}$, the four crawlers 12 are each angularly displaced to a specific, predetermined angular position $AP_N$, as described above and depicted in FIG. 8A, and the control 20 only uses the direction of the steering wheel displacement to determine the direction of rotation about the mainframe center C. That is, when the steering wheel 54 is turned in the second angular direction $A_2$, the control 20 directs the first pump 16A to operate the two left crawler motors 18 such that the left crawler tracks 26 are driven in the reverse direction $T_R$ and also directs the second pump 16B to operate the two right crawler motors 18 such that the right crawler tracks 26 are driven in the forward direction $T_F$, thereby causing the mainframe 2 to rotate in the second direction $A_2$, as depicted in FIG. 8B. Alternatively, when the steering wheel 54 is turned in the first angular direction $A_1$, the control 20 directs the first pump 16A and coupled motors 18 to drive the left crawler tracks 26 in forward direction $T_F$ and directs the second pump 16B and coupled motors 18 to drive the right crawler tracks 26 in reverse direction $T_R$, thereby rotating the mainframe 2 in the first direction $A_1$.

Further, with regard to the drum removal mode $M_{DR}$, the control 20 directs each steering cylinder 14 to move the coupled crawler assembly 12 to one of two possible angular positions $AP_N$ (only one shown) and to drive the motors 18 of only two diagonally opposing crawlers 12, depending on the rotation direction $A_1$, $A_2$ of the steering wheel 54. Specifically, when the steering wheel 54 is rotated in the second, counterclockwise direction $A_2$, the control 20 directs the crawlers 13A, 13B, 13C, 13D to rotate in the second direction $A_2$ to "leftward" positions $AP_A$, $AP_B$, $AP_C$, $AP_D$, respectively, and drives the motors 18 of the front left crawler assembly 13A and the rear right crawler assembly 13D, such that the mainframe 2 displaces in the left direction L, as described above and depicted in FIG. 9B. Alternatively, when the steering wheel 54 is rotated in the first, clockwise direction $A_1$, the control 20 directs the crawlers 13A, 13B, 13C, 13D to rotate in the first direction $A_1$ to rightward positions (not shown), and drives the motors 18 of the front right crawler assembly 13B and the rear left crawler assembly 13C, such that the mainframe 2 displaces in the right direction R. Thus, in summary, the steering device 50 with the preferred steering wheel 54 functions to generally direct (through the control 20) at least two crawler assemblies 12 to rotate in a desired direction $A_1$, or/and $A_2$ and, in most steering modes $M_N$, by a desired extent or amount proportional to movement of the wheel 54.

Referring now to FIGS. 18 and 21, to facilitate the operation of the control 20 as generally described above and in further detail below, the propulsion and steering system 10 preferably further comprises four speed sensors 50 each coupled with the control 20 and with a separate one of the crawler assemblies 12. Each speed sensor 50 is configured to sense the speed ST of one crawler track 26 and to generate and transmit to the control 20 a speed signal $s_{SP}$. Most preferably, each sensor 50 indirectly senses track speed ST by sensing the shaft rotational speed $r_S$ of the motor 18 drivingly coupled with the particular track 26. As such, each speed sensor 50 is preferably a rotary speed sensor, such as a Hall Effect sensor, configured to sense the speed $r_S$ of the shaft 18a of the associated motor 18. However, the speed sensors 50 may alternatively be arranged or/and constructed to sense the speed of one of the crawler assembly wheels 24, to directly sense track speed ST, etc., in any appropriate manner. In any case, the speed sensors 50 each transmit sensed speed (e.g., sensed shaft speed $r_S$) to the control 20, such that the control 20 uses the speed information to monitor for track slippage and as feedback to ensure that the crawler tracks 26 are driven at a desired speed ST, as described in detail below.

Referring particularly to FIG. 18, when the milling machine 1 is moving or traveling during a normal road milling operation (i.e., with the cutting drum 3 cuttingly engaging a roadway or other similar surface), the mainframe 2 generally travels in a generally straight path in the forward or reverse directions F, B (i.e., the mainframe 2 is not steering or turning) with the tracks 26 of all the crawler assemblies 12 moving at about the same speed ST, as discussed in further detail below. However, when one crawler assembly 12 loses traction or "slips" during such travel, the motor 18 of the particular crawler assembly 12 will rotate at a greater than normal speed as the track 26 circulates about the crawler wheels 24 without assisting in mainframe displacement. To ensure that the machine 1 operates in the intended manner, the control 20 is preferably further configured to provide an "anti-slip" function, such that when the control 20 determines that one of the crawler assemblies 12 on either side 2c, 2d of the mainframe 2 has a greater track speed ST than the other crawler assembly 12, the control 20 reduces the motor speed (i.e., shaft speed $r_S$) of the particular crawler assembly 12 until both crawler assemblies 12 are displacing at generally the same track speed ST.

More specifically, the control 20 is configured to sense the speed $ST_N$ of each crawler track 27N, specifically by sensing the motor shaft speed $r_S$ by means of the sensors 50, to compare the speeds $ST_A$, $ST_C$ of the tracks 27A, 27C of the front left and rear left crawler assemblies 13A and 13C, respectively, and to separately compare the track speeds $ST_B$, $ST_D$ of the front right and rear right crawler assembly tracks 27B, 27D. The control 20 is configured to then reduce motor speed, i.e., the shaft speed $r_S$, of one crawler assembly 12 when the sensed speed of that crawler assembly's track 26 (as preferably determined by motor speed $r_S$) is greater than the sensed track speed TS of the other crawler assembly 12 in the same lateral crawler assembly pair PL, PR. In other words, the control 20 reduces the motor speed $r_{SA}$, $r_{SC}$ of one of the left crawler assemblies 13A or 13C, respectively, when the sensed track speed $ST_A$, $ST_C$ of the one left crawler assembly 13A, 13C is greater than the sensed track speed $ST_C$, $ST_A$ of the other left crawler assembly 13C, 13A until the sensed track speed $ST_A$, $ST_C$ (i.e., sensed motor speed $r_S$) of both left crawler assemblies 13A, 13C is generally equal (i.e., $ST_A=ST_C$). In a similar manner, the control 20 reduces the motor speed $r_S$ of one of the two right crawler assemblies 13B or 13D when the sensed track speed $ST_B$ or $ST_D$ of the one right crawler assembly 13B, 13D is greater than the sensed track speed $ST_D$, $ST_B$ of the other right crawler assembly 13D, 13B until the track speeds of both right crawlers 13B, 13D are generally equal. Thus, the control 20 is configured to ensure that a slippage of any of the four tracks 26 is quickly corrected to prevent damage to the machine 1 or/and degradation of machine performance.

Referring now to FIGS. 19 and 26-29, the crawler assembly motors 18 are each preferably adjustable to vary the rotational speed $r_S$ of the motor output shaft 18a for a given rate of hydraulic fluid flow $F_H$ from the coupled pump 16A or 16B. In other words, each motor 18 is adjustable to rotate the output shaft 18a at a greater or lesser speed for the same, specific flow rate of fluid $R_{FH}$ from the pump 16A or 16B. Also, the pumps 16A, 16B are each adjustable to vary the rate of fluid flow $R_{FH}$ to the two coupled motors 18, so as to thereby adjust the rotational speed $r_S$ of the motors 18. With such adjustable motors 18 and adjustable pumps 16A, 16B, the control 20 is configured to both adjust the motors 18 to produce a plurality of different, selectable ranges of rotational speeds $r_S$, so as to thereby drive the coupled tracks 26 at a plurality of different, predetermined ranges of track speeds ST, and also to adjust the pumps 16A, 16B both to vary the motor rotational speed $r_s$ within a particular speed range or as required to maintain the motors 18 operating at each selected rotational speed $r_S$. In other words, all of the motors 18 are adjusted to provide a particular motor speed range (e.g., high speed and low torque, low speed and high torque, etc.), and then the pumps 16A, 16B are adjustable to regulate the flow rate $R_{FH}$ to the motors 18 so as to vary the motor speed $r_s$ within the particular speed range. Further, as discussed above, each motor 18 is preferably reversible by adjusting the pumps 16A, 16B to reverse the direction $f_1$, $f_2$ of fluid flow $F_H$ through the motor 18, as described in greater detail below.

Figures 27A, 27B, 27C:
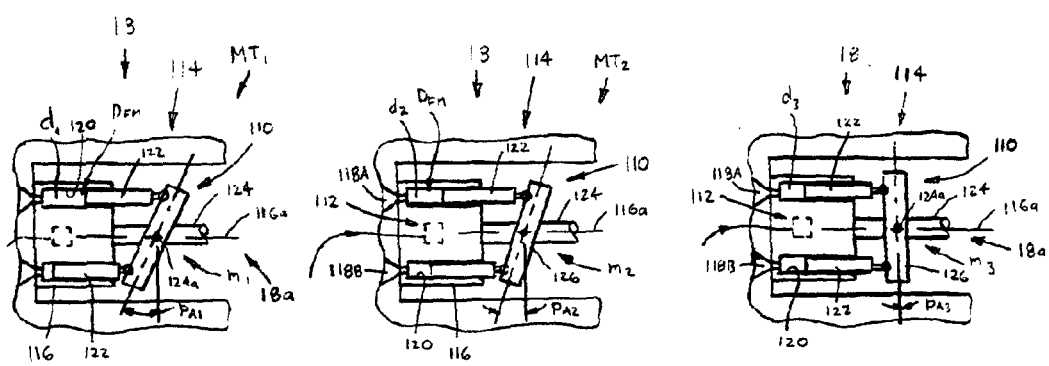
FIGS. 27A-27C, collectively

As best shown in FIGS. 27A-27C, each motor 18 is preferably adjustable between a plurality of different settings $m_n$ and is configured to drive the coupled track 26 at about a predetermined speed ST for a particular rate $R_{FH}$ of fluid flow from the coupled pump 16A, 16B at each setting $m_n$. The predetermined range of track speeds ST at each one of the motor settings $m_n$ is substantially different than the track speeds ST achievable at each other one of the motor settings $m_n$. For example, a first motor setting $m_1$ may produce a first range of track speeds between one mile per hour (1 mph) and 5 miles per hour (5 mph) whereas a second motor setting $m_2$ may produce a second range of track speeds between five miles per hour (5 mph) and ten miles per hour (10 mph), the particular track speed ST within each range being determined by the flow rate $R_{FH}$ from the pumps 16A, 16B. Further, it must be noted that a particular flow rate $R_{FH}$ from the pumps 16A, 16B will produce different motors speeds $r_s$ at different motor settings $m_n$. For example, a particular flow rate $R_{FH}$ may cause the tracks 26 to be driven at one mile per hour (1 mph) at the first motor setting $m_1$ and will drive the tracks 26 at five miles per hour (5 mph) at the second motor setting $m_2$. Thus, by adjusting the motor settings $m_n$, the motors 18 may be set to operate the coupled crawler tracks 26, and thus the milling machine 1, within a predetermined speed range, while the pumps 16A, 16B are adjusted to vary motor speed $r_s$ within the particular speed range.

Most preferably, each crawler motor 18 has an adjustable fluid displacement $D_{FM}$ (i.e., the volumetric fluid capacity), such that adjusting the motor 18 between the different motor settings $m_n$ varies the fluid displacement $D_{FM}$ of the motor 18. That is, each motor 18 is adjusted to one of a plurality of different fluid displacement values $d_1$, $d_2$, $d_3$, etc. when shifting between the different motor settings $m_1$, $m_2$, $m_3$, etc., respectively. As such, each motor 18 drives the coupled track 26 within a separate one of the predetermined track speed ranges when adjusted to each fluid displacement value $d_1$, $d_2$, $d_3$, etc. More specifically, for the same flow rate $R_{FH}$ from the coupled pump 16A or 16B, a motor setting $m_n$ with a greater fluid displacement $d_n$, e.g., setting $m_1$ with displacement $d_1$ (see FIG. 27A), provides a relatively lower shaft speed $r_s$ and thus a lesser track speed ST, and a relatively greater torque, in comparison with a motor setting $m_n$ with a lesser displacement $d_n$, e.g., setting $m_2$ with displacement $d_2$ (see FIG. 27B), which provides a relatively greater shaft speed $r_s$ and greater track speed ST, but a lesser torque. Preferably, at least one motor setting $m_n$, e.g., setting $m_3$, provides a zero displacement (i.e., $d_3$), such that hydraulic fluid flows through the motor without rotating the motor shaft 18a, and thus the coupled track 26, as indicated in FIG. 27C. Thus, when operating the machine 1 in the drum removal steering mode $MS_{DR}$ as described above, the control 20 adjusts the two non-driven motors 18 (e.g., motors 19B and 19C in FIG. 9B) to the zero displacement setting (i.e., setting $m_3$) such that fluid flows through the particular motors 18, but the motors 18 do not drive the coupled track 26.

With such a motor structure, the control 20 is preferably configured to adjust the fluid displacement $D_{FM}$ of the motors 18 to one of the plurality of fluid displacement values $d_1$, $d_2$, $d_3$, etc. when setting the motors 18 to drive the tracks 26 at particular one of the predetermined range of speeds, as discussed above and in further detail below. Furthermore, each pump 16A, 16B preferably has an adjustable fluid displacement $D_{FP}$ so as to vary the flow rate $R_{FH}$ to the two coupled motors 18 to thereby adjust motor speed $r_s$ at a particular motor setting $m_n$. As such, the control 20 is preferably configured to adjust the fluid displacement $D_{FP}$ of the two pumps 16A, 16B as required to operate the motors 18 in order to drive the tracks 26 at a desired speed ST, as discussed in greater detail below.

Figure 19:
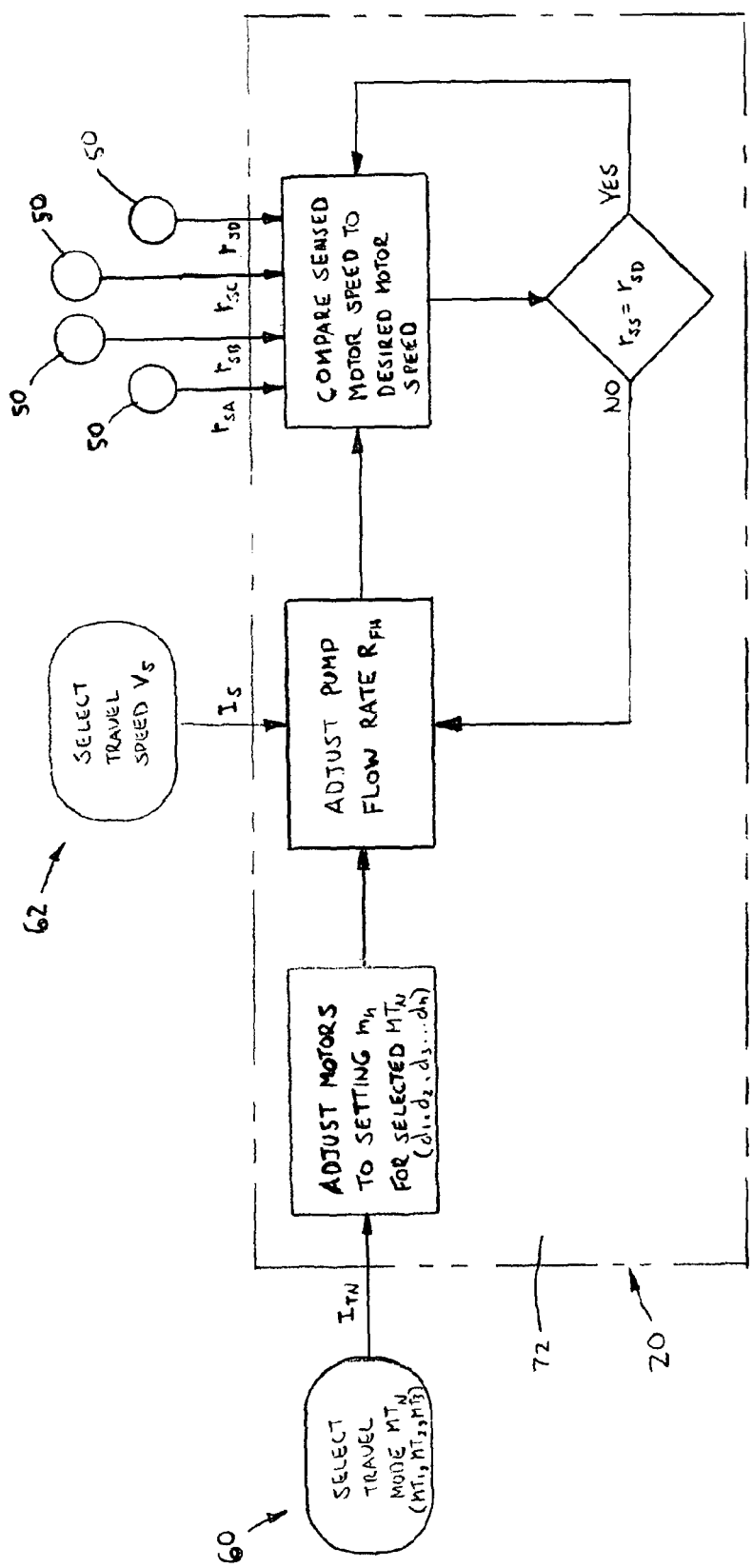
FIG. 19 is a modified flow diagram showing operation of the control to operate in a selected travel mode at a selected speed.

Referring now to FIGS. 19 and 21, the control 20 is preferably configured to operate the four crawler motors 18 and the two pumps 16A, 16B in a plurality of different vehicle travel modes $MT_N$, preferably at least three travel modes $MT_1$, $MT_2$, etc., such that the milling machine 1 is selectively drivable at various travel speed ranges. Preferably, the control 20 provides the different travel modes $MT_N$ by adjusting all the crawler motors 18 to the particular setting $m_n$ that provides a specific predetermined range of track speeds ST, as described above, so that the four tracks 26 displace the mainframe 2 at a corresponding vehicle travel speed range. More specifically, the control 20 is configured to selectively adjust all four of the motors 18 to a particular one of the motor settings $m_1$, $m_2$, etc. when adjusting the machine 1 to each one of the travel modes $MT_1$, $MT_2$, etc., respectively. Further, as discussed above, the control 20 is also configured to adjust the pumps 16A, 16B while the motors 18 operate a particular motor setting $m_n$ so as to provide a selected track speed TS, and thereby a vehicle travel speed VS, within a particular travel speed range. Also, the control 20 is further configured to monitor motor shaft speed $r_S$ (i.e., from speed sensor input) and to adjust the flow rate $RF_H$ of each pump 16A or 16B when the sensed shaft speed $r_S$ of at least one of the two coupled motors 18 varies from a selected shaft speed $r_S$, so as to maintain the machine traveling at a particular speed VS. Thus, the control 20 operates the crawler tracks 26 within a particular range of travel speeds for the particular travel mode $MT_N$ by adjusting the pumps 16A, 16 and not by adjusting the motor(s) 18 (i.e., motor displacement value).

Further, as the two motors 18 of each left and right pairs PL, PR of crawler assemblies 13A, 13C and 13B, 13D, respectively, are fluidly coupled in a circuit 21A or 21B (i.e., with the associated pump 16A or 16B), the coupled motors 18 receive the same hydraulic fluid flow $F_H$, and being adjusted to the same, specific motor setting $s_n$ for the particular travel mode $MT_N$, should have the same shaft speed. However, as discussed above, one motor 18 may rotate at a much greater speed during a slippage event/situation. In such an event, the control 20 adjusts the motor setting $m_n$ of that particular motor 18 to reduce motor shaft speed $r_S$ until both of the coupled motors 18 again rotate at the same speed $r_S$. When the crawler assembly 12 undergoing slippage thereafter regains traction, the speed of the previously slipping crawler assembly 12 will then be below the predetermined speed for the particular travel mode $MT_N$. Therefore, the control 20 then adjusts the motor 18 of that specific crawler assembly 12 back to the designated setting $m_n$ for the particular travel mode $MT_N$.

Figure 15:
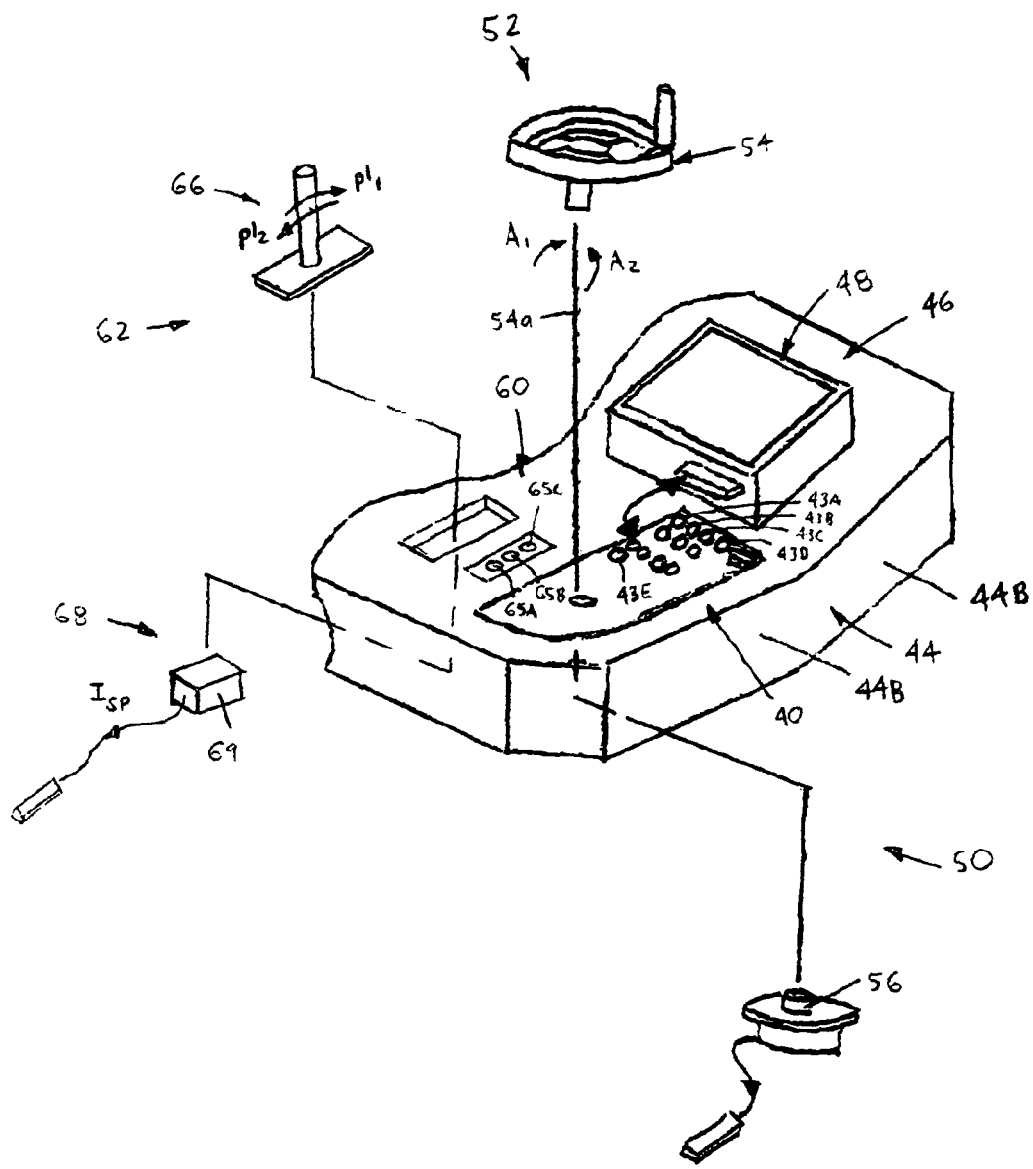
FIG. 15 is a partly exploded and partly broken away, perspective view of an operator control panel.
Figure 16:
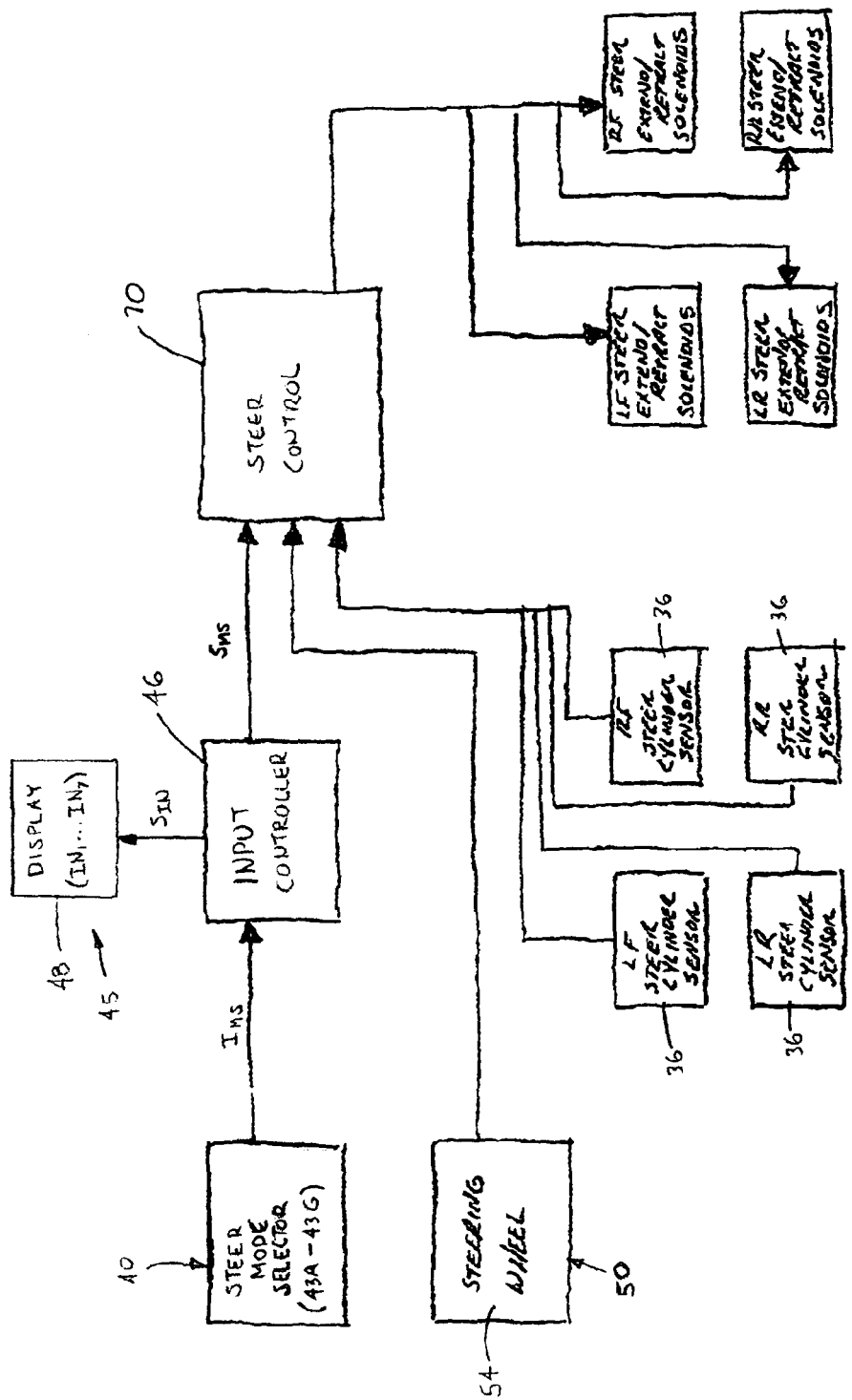
FIG. 16 is a modified schematic view of steer control portions of the control.

Referring to FIGS. 15, 19 and 21, to implement the plurality of travel modes $MT_N$, and to enable selection of a particular travel speed VS with a mode speed range, the propulsion and steering system 10 preferably further includes a travel mode selector 60 and a speed selector 62 each coupled with the control 20 and operable by a milling machine operator. The travel mode selector 60 is configured to selectively provide a plurality of travel mode inputs $I_{TN}$ (e.g., $I_{T1}$, $I_{T2}$, $I_{T3}$, etc.) to the control 20, the control 20 being configured to adjust to a separate one of the travel modes $MT_1$, $MT_2$, $MT_3$, etc. when the control 20 receives each one of the plurality of travel mode inputs $I_{T1}$, $I_{T2}$, $I_{T3}$, respectively. The mode selector 60 preferably includes a plurality of input members, most preferably three pushbuttons or switches 65A, 65B, 65C, each configured to provide a separate one of the mode inputs $I_{T1}$, $I_{T2}$, $I_{T3}$, respectively, when manipulated by the operator (i.e., "pushed").

Further, the speed selector 62 is configured to selectively provide a variable speed input $I_{SP}$ to the control 20 which corresponds to a desired milling machine travel speed VS. The control 20 is configured to appropriately adjust the pumps 16A, 16B so as to drive all of the motors 18 at a particular desired rotational speed $r_s$ determined to provide the selected travel speed VS. As best shown in FIG. 15, the speed selector 62 preferably includes a "propel" lever 66 displaceable or shiftable by a machine operator and a position sensor device 68 connected with the control 20, configured to sense the position of the lever 66, and to provide a speed input signal $I_{SP}$ to the control 20. The lever 66 is displaceable, preferably slidably or pivotally in opposing directions $pl_1$, $pl_2$ between a lowest speed position and a highest speed position (neither indicated). Further, the position sensor 68 is preferably a switch box 69 including one or more switches that open and/or close in response to the movement of the propel lever 66, and generates signals $I_{SP}$ corresponding to the position of the lever 66. Further, the control 20 is configured to adjust the flow rate $R_{FH}$ of both of the pumps 16A, 16B to be generally proportional to the lever position. In other words, when the lever 66 moves in the first direction $pl_1$ toward the maximum speed position, the control 20 increases the flow rate $R_{FH}$ of the pumps 16A, 16B, thereby correspondingly increasing motor speed $r_S$, and vice-versa. Thus, the machine operator moves the shift lever 66 to a relative position corresponding to a desired travel speed VS, and the control 20 uses the sensed position information from the sensor 68 to appropriately drive the pumps 16A, 16B.

Referring to FIGS. 20 and 21, the control 20 preferably includes a steer control 70 (FIG. 20) configured to operate the steering actuators and to implement the steering modes $MT_N$ and a propel control 72 (FIG. 21) configured to operate the pumps 16A, 16B and the motors 18 and to implement the travel modes $MT_N$. Specifically, the steer control 70 is operatively connected with each of the four steering actuators 14 and is coupled with the mode selector device 40 and with the operator steering device 50, as described above. The propel control 72 is operatively connected with the four crawler motors 18 and the two pumps 16A, 16B and is coupled with the travel mode selector 60 and with the speed selector 62.

More specifically, the steer control 70 includes at least one and preferably two controllers 74, specifically a front steering controller 76A and a rear steering controller 76B, the controllers 76A, 76B being programmed (directly or by software) to selectively operate the four steering cylinders 14 in each of the steering modes $MS_N$, as described in detail above. The front steering controller 76A is operatively connected with the two front steering cylinders 15A, 15B and the rear steering controller 76B is operatively connected with the two rear steering cylinders 15C, 15D. Further, the steer control 70 also preferably includes a BUS 78 electrically connecting each of the steering mode selector device 40 and the operator steering device 50 with the two steering controllers 76A, 76B. Thereby, both controllers 76A, 76B receive the steering mode command signals $S_{MS}$ from the steering mode selector 40 and the steering input $I_{ST}$ from the steering device 50, and each separately operates the connected steering cylinders 14 as appropriate to implement the machine operator's commands. For example, when a machine operator selects a front steer mode $MS_{FS}$ and turns the steering wheel 54 toward the right direction R, the front steer controller 76A directs the two front steering actuators 15A, 15B to rotate the front crawler assemblies 13A, 13B in the first angular direction $A_1$, while the rear steer controller 76B does not operate the rear steering actuators 15C, 15D. Furthermore, the steering controllers 76A, 76B are also preferably connected with the linear position sensors 36 of the two connected steering actuators 15A/15B and 15C/15D, respectively, such that the controllers 76A, 76B receive a position signal $s_{lp}$ corresponding to the linear position of each steering actuator 14 (i.e., position of rod 32 with respect to cylinder body 34). As such, the steering controllers 76A, 76B convert the linear position signals $s_{lp}$ to the angular position of each crawler assembly 12 about its vertical axis 12a, and thus use the steering sensor signals $s_{lp}$ as feedback to appropriately control the angular positioning of the crawler assemblies 12, as described above.

Referring now to FIG. 21, the propel control 72 preferably also includes at least one and most preferably two controllers 74, specifically a left propel controller 80A and a right propel controller 80B. The propel controllers 80A, 80B are programmed (directly, by installed application software, etc.) to selectively operate the two pumps 16A, 16B and the four motors 18 in each of the various travel modes $MT_N$ and to operate the motors 18 (and thus crawler tracks 26) at a variable, operator selected speed, as described above. The left propel controller 80A is operatively connected with the left pump 16A and the motors 19A, 19C of the left pair PL of crawler assemblies 13A, 13C, while the right propel controller 80B is operatively connected with the right pump 16B and the motors 19B, 19D of the right pair PR of crawler assemblies 13B, 13D. Further, the propel controllers 80A, 80B are also operatively connected with the particular pump transmission 23A, 23B, respectively, which couples the associated pump 16A, 16B with the engine 6, and with the engine 6. As such, the controllers 80A, 80B adjust the flow rate $R_{FH}$ of the associated pump 16A, 16B, respectively, by adjusting the pump transmission 23A, 23B, respectively, or by adjusting the engine 6 to vary rotational speed of the engine output shaft 6a.

Further, the propel control 72 also incorporates the BUS 78, which electrically connects each of the travel mode selector 60 and the speed selector 62 with the two steering controllers 80A, 80B. Thereby, both propel controllers 80A, 80B receive the travel mode inputs $I_{TN}$ from the travel mode selector 60 and the speed input signals $I_{SP}$ from the speed selector 62, and each separately operates the associated pump 16A or 16B and the two motors 18 coupled therewith as appropriate to implement the machine operator's commands.

Furthermore, as the BUS 78 connects all four of the controllers 76A, 76B, 80A, 80B, the propel controllers 80A, 80B also appropriately operate the pumps 16A, 16B and the motors 18 in response to the steering mode command signals $S_{MS}$ from the steering mode selector 40 and the steering input $I_S$ from the steering device 50. That is, the propel controllers 80A, 80B operate the pumps 16A, 16B and the motors 18 as appropriate for the particular steering mode $MS_N$ selected by a machine operator and appropriate for the direction in which the milling machine 1 is turned or steered. For example, when the operator selects the circle steer mode $MS_{CS}$ and turns the preferred steering wheel 54 in the left direction L, the left propel controller 80A operates the left pump 16A such that the motors 18 of left pair PL of crawlers 13A, 13C are driven in the reverse direction $T_R$ and the right propel controller 80B operates the right pump 16B to drive the motors 18 of right pair PR of crawlers 13B, 13D in the forward direction $T_F$.

Having described the basic components and functions of the present invention above, these and other elements of the propulsion system 10 are described in further detail below.

Referring first to FIGS. 1 and 2, the milling machine mainframe 2 includes a generally rectangular box frame 4 formed as a weldment of a plurality of plates, but may be formed in any appropriate manner, such as for example, including a skeleton or truss frame covered by plates (not shown). The milling machine 1 preferably further includes a drive system 5 rotatably connecting the drum 3 to the mainframe 2 and one or more conveyors 8 for transporting material cuttings from proximal to the drum 3 to a dump truck (not shown) or other appropriate location for subsequent disposal. An operator station 9 is located on the mainframe 2 and provides a space for one or more milling machine operators and operator control devices 40, 50, 60 and 62, as described above and in further detail below.

Referring to FIGS. 4 and 5, the frame 22 of each crawler assembly 12 includes a generally rectangular box 80 having opposing front and rear ends 80a, 80b spaced apart along the frame centerline $CL_F$ and opposing inner and outer sidewalls 81A, 81B extending between the two ends 80a, 80b. The drive wheel 25 is preferably formed as a relatively larger sprocket wheel 82 rotatably mounted to the frame rear end 80b and the crawler wheels 24 further include an idler sprocket wheel 83 connected with the frame front end 81a, such that the associated crawler track 26 extends generally about the drive and idler sprockets 82, 83. Further, the wheels 24 also include a plurality of bogie wheels 84 (e.g., four wheels 84) disposed between and rotatably mounted to the frame sidewalls 81A, 81B. Furthermore, each crawler track 26 is preferably formed of a chain 84 engageable by the drive and idler sprockets 82, 83 and a plurality of connected rectangular blocks 85 attached to the chain 84, but may alternatively formed of a single integral body, such as a molded elastomeric belt.

Referring to FIGS. 2, 4 and 5, each crawler assembly shaft 28 preferably includes upper and lower shaft sections 92, 94. The shaft upper section 92 is connected with mainframe 2 and includes the shaft upper end 28a and the shaft lower section 94 is connected with the crawler frame 22 and provides the shaft lower end 28b. The shaft lower section 94 is rotatably coupled with the upper section 92 so as to be angularly displaceable about the crawler vertical axis 12a, to thereby displace the connected crawler assembly 12 about the axis 12a. Further, the shaft upper section 92 is movably coupled with the mainframe 2 such that the mainframe 2 is vertically displaceable to adjust engagement of the cutting drum 3 with a working surface S. Furthermore, the shaft lower section 94 preferably includes a generally C-shaped connective yoke 95 at the shaft lower end 28b, which is pivotally connected with the crawler frame 22.

Figure 23:
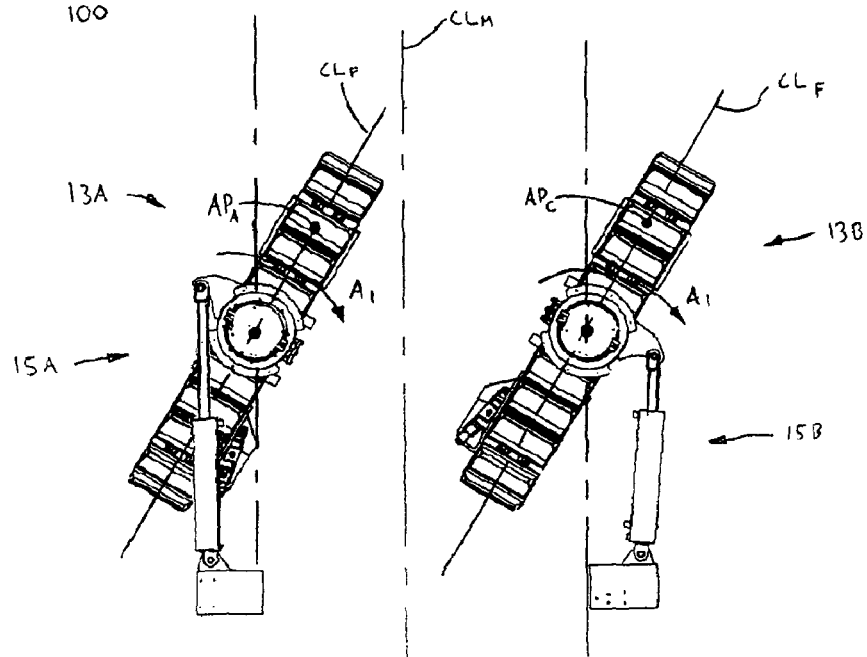
FIG. 23 is a reduced, top plan view of the crawlers and steering actuators of FIG. 22, showing one actuator extended and one actuator retracted.
Figure 24:
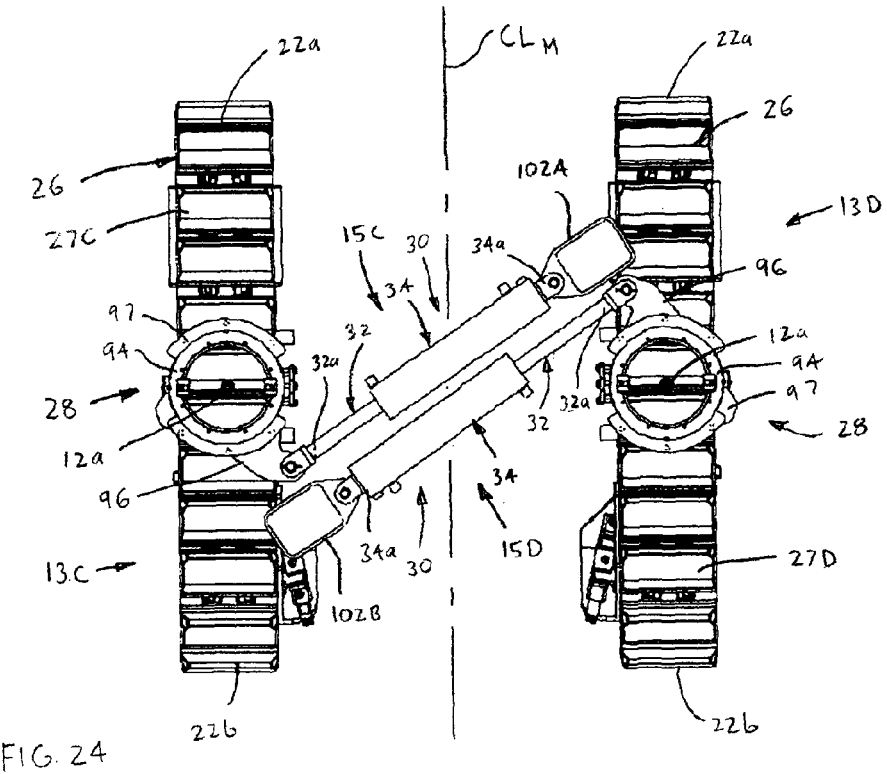
FIG. 24 is a top plan view of a rear pair of crawler assemblies and two rear steering actuators.
Figure 25:
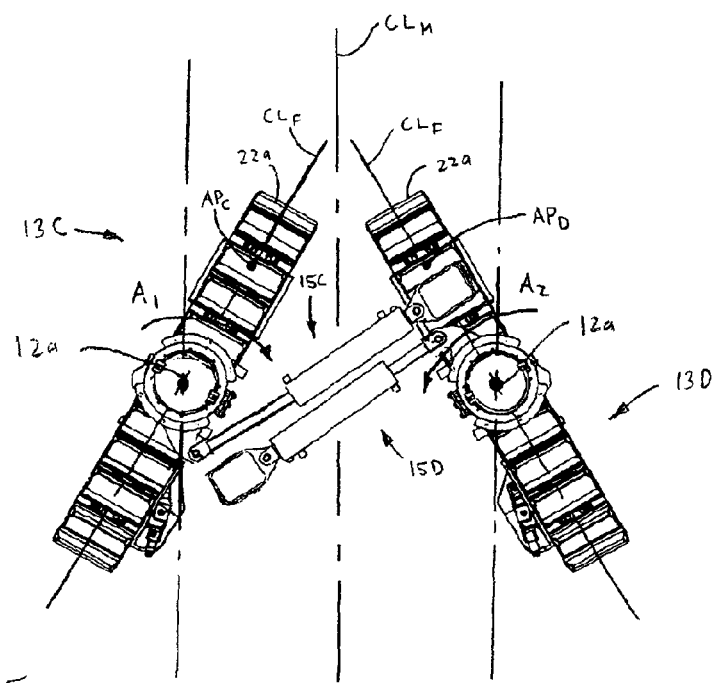
FIG. 25 is a reduced, top plan view of the crawlers and steering actuators of FIG. 24, showing one actuator extended and one actuator retracted.

Referring to FIGS. 22-25, the shaft lower section 94 also preferably includes an arm member or steering arm 96 extending from the shaft portion outer surface 94a generally perpendicularly with respect to the crawler axis 12a, the arm 96 being mounted to the lower shaft section 94 by a generally circular ring 97 disposed about the shaft section 94. Each steering arm 96 provides a "lever arm" for use by the associated steering actuator 14 to pivot the shaft lower section 94, and thus the remainder of the crawler assembly 12, about the crawler vertical axis 12a, as discussed below. For reasons described below, the steering arms 96 of the front crawler shafts 28 preferably each extend generally in a direction outwardly away from the mainframe centerline $CL_M$ (FIGS. 22 and 23), while the steering arms 96 of the rear crawler shafts 28 are each angled generally toward the machine centerline $CL_M$ (FIGS. 24 and 25). More specifically, the arm 96 of the left crawler assembly 13C extends generally rearwardly and the arm 96 of the right crawler assembly 13D extends generally frontwardly, as best shown in FIG. 24.

Still referring to FIGS. 22-25, the steering actuators 14 are preferably arranged on the mainframe 2 such that the two hydraulic cylinders 30 of the front steering actuators 15A, 15B extend generally along or parallel with, but spaced on opposing sides from, the mainframe centerline $CL_M$, and the two cylinders 30 of the rear actuators 15C, 15D extend generally across the centerline $CL_M$. Specifically, the outer end 34a of the cylinder body 34 of each front actuator cylinder 30 is pivotally connected to the mainframe 2 by a generally rectangular bracket 100 mounted to the mainframe lower surface 2e (FIG. 2) at a position above and generally rearwardly of the associated crawler assembly 12. The outer end 32a of each cylinder rod 32 is pivotally attached to the steering arm 96 of the associated crawler shaft 28, such that each actuator cylinder 30 extends generally outwardly of each crawler assembly 12. With this arrangement, when the rods 32 of both front steering actuators 15A, 15B are extended, the frame front ends 22a of each coupled crawler assembly 12 is rotated "inwardly"; in other words, the left front crawler assembly 13A is angularly displaced in the first direction $A_1$ and the right front crawler assembly 13B is angularly displaced in the second direction $A_2$, such that the frame front ends 22a move toward the centerline $CL_M$ and each other. Alternatively, when the two front steering actuator cylinders 30 are retracted, the coupled crawler assembly 12 is rotated "outwardly"; in other words, the left front crawler assembly 13A is angularly displaced in the second direction $A_2$ and away from the centerline $CL_M$, and the right front crawler assembly 13B is angularly displaced in the first direction $A_1$ and away from the centerline $CL_M$. Further, to displace each crawler assembly 13A, 13B in the same angular direction $A_1$ (as shown) or $A_2$, one cylinder 30 is extended and the other cylinder 30 is extended, as shown in FIG. 23.

Further, the outer end 34a of each cylinder body 34 of the two rear steering actuators 15C, 15D is pivotally connected with the mainframe 2 by a generally rectangular bracket 102A, 102B mounted to the mainframe lower surface 2e. Preferably, the bracket 102A of the rear left actuator 15C is preferably located generally forwardly of the shaft 28 of the rear right crawler assembly 13D and the rear right actuator bracket 102B is located generally rearwardly of the rear left crawler shaft 28, as best shown in FIGS. 24 and 25. With the steering arms 96 arranged as described above, the left actuator cylinder 30 extends from the mounting bracket 102A across the mainframe centerline $CL_M$ to the steering arm 96 mounted on the rear left crawler shaft 28 and the rear right actuator cylinder 30 extends from the bracket 102B across the centerline $CL_M$ to the steering arm 96 on the rear right crawler shaft 28, such that the two actuators 15C, 15D are generally parallel, but oppositely oriented. In operation, extension of the each cylinder 30 of the rear steering actuator 15C, 15D causes the frame front ends 22a of each coupled crawler assembly 12 to rotate "inwardly"; in other words, the left rear crawler assembly 13C is angularly displaced in the first direction $A_1$ and the right rear crawler assembly 13D is angularly displaced in the second direction $A_2$, such that both frame front ends 22a move toward the centerline $CL_M$ and each other. Alternatively, when the rear steering actuator cylinders 30 are retracted, the front ends 22a of the coupled crawler assemblies 12 are rotated "outwardly" and away from the centerline $CL_M$; in other words, the left rear crawler assembly 13C is angularly displaced in the second direction $A_2$ and the right rear crawler assembly 13D is angularly displaced in the first direction $A_1$.

Although each of the four steering actuators 15A, 15B, 15C, and 15C preferably include a hydraulic cylinder 30 arranged as described above, it is within the scope of the present invention to construct the steering actuators 14 in any other appropriate manner and/or to arrange the cylinders in any other appropriate manner. For example, each steering actuator 14 may include a hydraulic or electric motor connected with the associated crawler assembly 12 by an appropriate mechanism or gear train, such that motor rotation in opposing directions rotates the connected crawler assembly 12 in the opposing directions $A_1$, $A_2$. The scope of the present invention is not limited by the structure of the particular steering actuators 14, but includes all appropriate actuator constructions capable of functioning generally as described herein.

Figure 26:
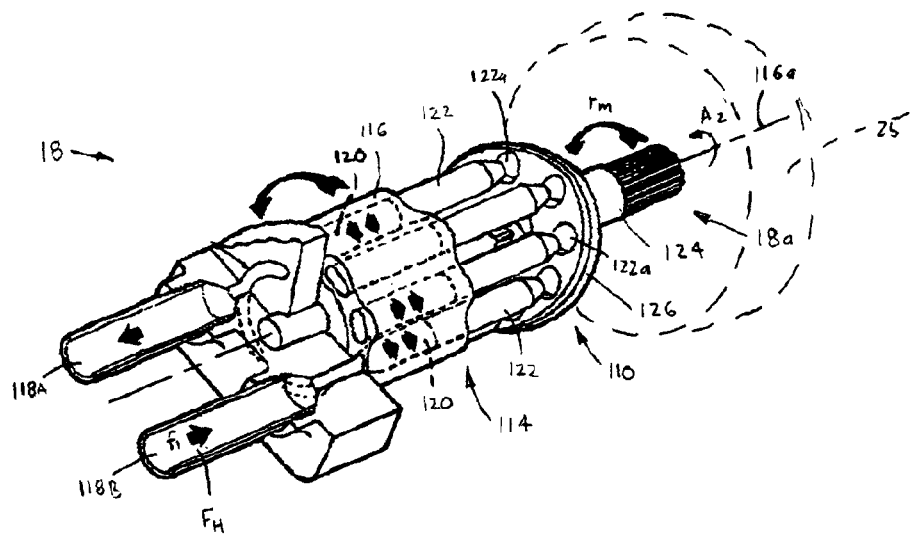
FIG. 26 is a more diagrammatic, perspective view of a preferred motor structure.

Referring now to FIGS. 26 and 27, each crawler motor 18 is preferably constructed so as to include an adjustable drive member 110 and an actuator 112 connected with the drive member 110. The motor drive member 110 is adjustable between a plurality of positions $p_{A1}$, $p_{A2}$, $p_{A3}$, etc., so as to adjust the fluid displacement $DF_M$ of the motor 18, as described above. The motor adjustment actuator 112 is coupled with the control 20, preferably with one of the propel controllers 80A, 80B, and is configured to displace the drive member 110 between the plurality of positions $p_{A1}$, $p_{A2}$, $p_{A3}$, etc., as described in greater detail below.

Most preferably, each motor 18 is an axial piston motor 114 having a cylindrical body 116 with a central axis 116a, first and second ports 118A, 118B, and a plurality of bores 120 fluidly coupleable with the first and second ports 118A, 118B. A plurality of pistons 122 are each disposed within a separate one of the bores 120 and an output shaft 124 is partially disposed within the body 116, the output shaft 124 being either connected with or providing the motor shaft 18a. Further, the drive member 110 preferably includes a swashplate 126 mounted to the output shaft 124 and each piston 122 has a drive end 122a disposed against or/and attached to the swashplate 126. The motor 114 is configured such that flow into one of the first and second ports 118A, 118B reciprocatingly linearly displaces the pistons 122 and discharges the fluid out of the other one of the first and second ports 118B, 118A. As such, linear displacement of the at least one piston 122 rotates the swashplate 126 so as to rotate the output shaft 124 about the axis 116a, thereby rotating the drive wheel 25 connected with the particular motor 18. Further, the speed of rotation of the swashplate 126, and thus the rotational speed $r_s$ of the output shaft 124/motor shaft, is directly proportional to the linear displacement of the pistons 122. That is, the greater the piston displacement, the greater the shaft rotational speed $r_S$ and the lesser the shaft torque $t_S$, and vice-versa.

With this preferred structure, the motor adjustment actuator 112 is configured to pivot the swashplate 126 about the body axis 116a to one of a plurality of predetermined plate angular positions $p_{A1}$, $p_{A2}$, $p_{A3}$, etc., each corresponding to a separate motor setting $m_1$, $m_2$, $m_3$, etc., as described above. By varying the plate angle $p_{An}$, the length of linear displacement of the pistons 122 within the associated bores 120 is correspondingly varied, thereby varying the rotational speed of the swashplate 126 (and output shaft 124) and the volume of fluid drawn into and discharged from each bore 122. Preferably, the motor adjustment actuator 112 includes one or more mechanical actuators coupled with the plate 126, such as a hydraulic cylinder, off-setting and on-setting control pistons, etc. (none shown) configured to pivot the swashplate 126 about an axis 124a perpendicular to the body axis 116a. Further, the preferred linear piston motor 114 is drivable in forward and reverse directions $f_m$, $r_m$, so as to rotate the output shaft 124 in opposing angular directions $A_1$, $A_2$, by reversing the flow into and out of first and second ports 118A, 1181B. That is, when fluid flows in a first direction $F_1$ into the first port 118A and out of the second port 118B, the output shaft 124 (and thus the connected drive wheel 25) is driven in the first angular direction $A_1$, and alternatively, when fluid flows in a second direction $F_2$ into the second port 118B and out of the first port 118A, the output shaft 124 (and connected drive wheel 25) is driven in the second angular direction $A_2$, as shown in FIG. 26. The direction of the fluid flow $F_1$, $F_2$ is determined by the operation of the coupled pump 16A, 16B, as discussed above and in further detail below. Although axial piston motors 114 are presently preferred, each crawler assembly motor 18 may be any other appropriate type of motor 18 (e.g., vane motor, gear motor, etc.). The scope of the present invention is not limited to any specific motor structure, but encompasses all appropriate types of motors 18 such that the propulsion and steering system 10 is capable of functioning generally as described herein.

Figure 28:
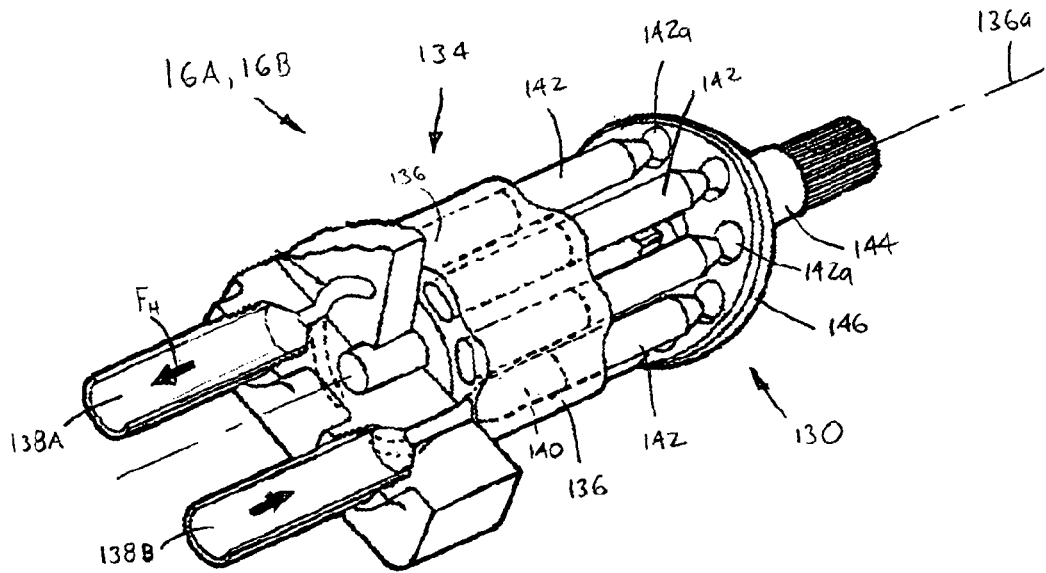
FIG. 28 is a more diagrammatic, perspective view of a preferred pump structure.
Figure 29:
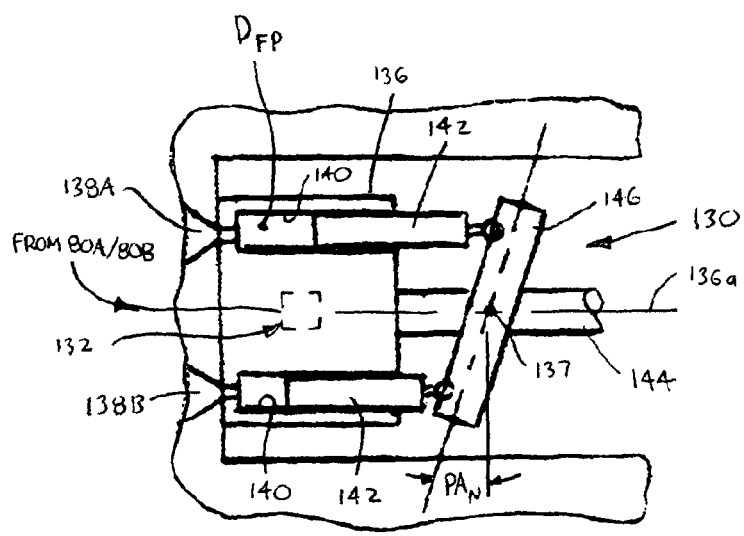
FIG. 29 is a more diagrammatic, side plan view of the pump of FIG. 28.

Referring to FIGS. 28 and 29, each pump 16A, 16B is preferably constructed so as to include an adjustable drive member 130 and at least one control actuators 132 operatively coupled with the drive member 130. Each pump drive member 130 is adjustable between a plurality of positions so as to adjust the fluid displacement $DF_P$ of the particular pump 16A or 16B, as described above, so as thereby adjust the pump flow rate $R_{FH}$ to vary the rotational speed $r_s$ of the two coupled motors 18, and/or to vary the flow direction through the pump 16A, 16B. The pump adjustment actuators 132 are each coupled with the control 20, preferably with a separate one of the propel controllers 80A, 80B, and are each configured to displace the associated pump drive member 130 between the plurality of positions.

Most preferably, each pump 16A, 16B is an axial piston pump 134 having a cylindrical body 136 with a central axis 136a, first and second ports 138A, 113B, and a plurality of bores 140 fluidly coupleable with the first and second ports 138A, 138B. A plurality of pistons 142 are each disposed within a separate one of the bores 140 and an input shaft 144 is partially disposed within the body 136, the input shaft 144 being connected with the engine 6 by the main transmission 7 and one of the pump transmissions 23A or 23B. Further, the drive member 130 preferably includes a swashplate 146 mounted to the input shaft 144 and each piston 142 has a driven end 142a disposed against/attached to the swashplate 146. The axial piston pump 134 is configured such that rotation of the input shaft 144 rotates the coupled swashplate 146 so as to linearly reciprocate the pistons 142 within the bores 140. Such reciprocating movement of the pistons 142 causes fluid to be drawn through one of the ports 138A or 138B and discharged out of the other one of the ports 138B, 138A, respectively, the flow being discharged from the one port 138A or 138B being directed into the two coupled motors 18 to drive the motors in one of the forward or reverse directions $f_m$, $r_m$.

With the above-described preferred structure, the first pump actuator 132 is configured to pivot the swashplate 136 about an axis 137 generally perpendicular to the plate rotational axis 136a in response to a speed control input signal $I_S$ sent from the speed selector 62 to the propel control 72. As such, the swashplate 136 is adjusted to an angle $p_{An}$ that is predetermined to provide a flow rate $R_{FH}$ that will operate the motors 18 at a rotational speed $r_s$, which drives the crawler tracks 26 to achieve the operator selected speed. Further, to reverse the direction of flow $F_1$, $F_2$ through the pump 16A or 16B, the control actuator 132 rotates the swashplate 146 such that the pistons 142 which were drawing fluid within the associated bore 140 are positioned in the bore 140 to discharge fluid, while each piston 142 which was discharging fluid from its bore 140 is now positioned to draw fluid therein. Preferably, the first pump actuator 132 includes one or more mechanical actuators coupled with the plate 136, such as a hydraulic cylinder, off-setting and on-setting control pistons, etc. (none shown). Although axial piston pumps 134 are presently preferred, each pump 16A, 16B may be any other appropriate type of pump (e.g., vane pump, gear pump, etc.), and the present invention is not limited to any specific pump structure.

Referring to FIGS. 7 and 21, each pump-motor fluid circuit 21A, 21B is preferably arranged such that the first port 138A of each pump 16A, 16B is fluidly connected with the first port 118A of each of the two coupled motors 18 and the second port 138B of each pump 16A, 16B is fluidly connected with the second port 118B of the two coupled motors 18. As such, fluid flow out of each pump first port 138A flows in a first direction $F_1$ into the first ports 118A of the two coupled motors 18, drives each motor shaft 18a in the first, forward direction $f_m$, thus driving the coupled tracks 26 in the forward direction $T_F$, then flows out of each motor second port 118B and into the coupled pump second port 138B. Alternatively, when fluid flows out of each pump second port 138B, such flow in a second direction $F_2$ and enters into the second ports 118B of the two coupled motors 18, drives each motor shaft 18a in the second, reverse direction $r_m$, thereby driving the connected track 26 in the reverse direction $T_R$, then flows out of each motor first port 118A and into the coupled pump first port 138A. Thus, as mentioned above, the rotational direction of the crawler assembly motors 18, and thus the crawler tracks 26, is alternatively driven in forward and reverse directions $T_F$, $T_R$, by adjusting the coupled pump 16A, 16B to thereby reverse the direction $F_1$, $F_2$ of the hydraulic fluid flow. As such, the tracks 26 of the left pair PL of crawler assemblies 13A/13C and the tracks 26 of the right pair PR of crawler assemblies 13B/13D are drivable in either the same direction $T_F$ or $T_R$ or simultaneously in opposing directions $T_F$, $T_R$, as discussed above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined generally in the appended claims.

We claim:

1. A propulsion system for a road milling machine, the milling machine including a mainframe with front and rear ends, a center, and a centerline extending between the two ends and through the center, and a rotatable cutter drum coupled with the mainframe, the system comprising:

four crawler assemblies each movably coupled with the mainframe so as to define front and rear pairs of crawler assemblies, each crawler assembly having a vertical axis, being angularly displaceable about the vertical axis, and including a frame with a centerline, a plurality of wheels rotatably mounted to the frame, an endless track disposed about the wheels, and a motor configured to rotate at least one wheel in opposing angular directions so as to drive the endless track in opposing angular directions about the plurality of wheels and generally along the frame centerline;

four steering actuators each operatively coupled with a separate one of the four crawler assemblies and configured to angularly displace the coupled crawler assembly about the crawler vertical axis independently of the others of the four crawler assemblies; and a control operatively coupled with each one of the four steering actuators and configured to selectively and independently operate the four actuators in a plurality of different steering modes, one steering mode being a circle steer mode such that one of the front pair of crawler assemblies angularly displaces in a first direction about the crawler vertical axis, the other one of the front pair of crawler assemblies independently angularly displaces in a second, opposing direction about the crawler vertical axis, one of the rear pair of crawler assemblies angularly displaces in the first direction about the crawler axis, and the other one of the rear pair of crawler assemblies independently angularly displaces in the second direction about the crawler axis wherein the control includes a microprocessor electrically connected with each one of the four steering actuators and a program installed within the microprocessor, the program being configured to selectively and independently operate the four steering actuators in each one of a plurality of different steering modes.

2. The system as recited in claim 1 wherein:

the four crawler assemblies are arranged on the mainframe so as to define a front left crawler assembly, a front right crawler assembly, a rear left crawler assembly, and a rear right crawler assembly; and when the control is in the circle steer mode, the control directs the four actuators such that the front left and rear right crawler assemblies each angularly displaces in the first angular direction about the crawler vertical axis and the front right and rear left crawler assemblies each angularly displaces in the second direction about the crawler vertical axis.

3. The system as recited in claim 1 wherein the control is operatively coupled with all four crawler motors and is further configured to operate the motors when in the circle steer mode such that the endless track of one of the front pair of crawler assemblies is rotated in a first angular direction, the track of the other one of the front pair of crawler assemblies is rotated in a second, opposing angular direction, the track of one of the rear pair of crawler assemblies is rotated in the first direction, and the track of the other one of the rear pair of crawler assemblies is rotated in the second direction such that the mainframe is angularly displaced generally about the mainframe center while the mainframe center remains generally at a fixed position on a base surface.

4. The system as recited in claim 3 wherein when the control operates the four steering actuators to angularly displace the four crawler assemblies in the circle steer mode, the front pair of crawler assemblies are rotated such that the centerlines of the two front crawler assembly frames are generally converging forwardly of the mainframe and the rear pair of crawler assemblies are rotated such that the centerlines of the two rear crawler assembly frames are generally converging rearwardly of the mainframe.

5. The system as recited in claim 3 wherein the control includes a first control operatively coupled with the four steering actuators and a second control operatively connected with the four crawler motors.

6. The system as recited in claim 3 wherein:
the mainframe has left and right sides and each one of the front and rear pairs of crawler assemblies includes a left crawler assembly and a right crawler assembly, each one of the left and right crawler assemblies being located generally proximal to the corresponding one of the mainframe sides; and
the control is configured to independently operate the four crawler assemblies in a drum removal mode in which the control directs the two front steering actuators to independently angularly displace both of the front pair of crawler assemblies in one of the first and second directions, directs the two rear steering actuators to independently angularly displace both of the rear pair of crawler assemblies in the other one of the first and second directions, directs the motor of one of the left and right front crawler assemblies to drive the coupled track in the second angular direction such that the one front crawler assembly is driven generally rearwardly toward the mainframe center, and directs the motor of the one of the left and right rear crawler assemblies proximal to the mainframe side opposite to the mainframe side proximal to the one driven front crawler assembly to drive the coupled track in the first angular direction such that the one rear crawler assembly is driven generally frontwardly toward the mainframe center so that the mainframe is generally linearly displaced in one of two lateral directions and the mainframe remains at a generally fixed angular position about the mainframe center.

7. The system as recited in claim 1 wherein the control is further configured to selectively and independently operate the four crawler assemblies in at least one of the following steering modes:
a front steer mode in which the control directs the two front steering actuators to independently angularly displace the two front crawler assemblies in the same one of the first and second directions about the crawler vertical axes, the rear crawler assemblies being disposed such that the frame centerlines extend generally along the frame centerline such that when the control operates the four crawler motors, the mainframe both linearly displaces and angularly displaces about the frame center in one of two lateral directions;
a rear steer mode in which the control directs the two rear steering actuators to independently angularly displace the two rear crawler assemblies in the same one of the first and second directions about the crawler vertical axes, the front crawler assemblies being disposed such that the frame centerlines extend generally along the frame centerline such that when the control operates the four crawler motors, the mainframe both linearly displaces and angularly displaces about the frame center in the one of the first and second directions;
a crab steer mode in which the control directs all four steering actuators to independently angularly displace all four crawler assemblies in the same one of the first and second directions about the crawler vertical axes such that when the control operates the four crawler motors, the mainframe linearly displaces in an angled direction extending both generally toward one of the front and rear mainframe ends and generally toward one of the left and right mainframe sides;
a coordinated steer mode in which the control directs the two front steering actuators to independently angularly displace the two front crawler assemblies in the same one of the first and second directions about the crawler vertical axes and directs the two rear steering actuators to angularly displace the two rear crawler assemblies in the other one of the first and second directions about the crawler vertical axes such that when the control operates the four crawler motors, the mainframe linearly displaces in a direction extending generally toward one of the left and right mainframe sides; and
a curb pullaway mode in which the control directs the steering actuators of the two crawler assemblies proximal to one of the left and right sides of the mainframe to independently displace in a lateral direction generally toward the one mainframe side through a first angle and the steering actuators of the other two crawler assemblies to independently displace generally in the lateral direction through a second angle, the first angle being substantially greater than the second angle, and directs all four crawler motors to each drive the coupled track in the same direction such that the mainframe displaces generally in the lateral direction.

8. The system as recited in claim 1 further comprising a mode selector device operatively coupled with the control and configured to selectively adjust the control between each one of the at least two steering modes.

9. The system as recited in claim 8 wherein the mode selector includes at least one user input member manipulatable by a milling machine operator to select the steering mode.

10. The system as recited in claim 8 further comprising an indicator device coupled with the control and configured to provide at least a first indication when the control is in the circle steer mode and a second indication when the control is in the at least one other steering mode.

11. The system as recited in claim 1 wherein:
the system further comprises an operator steering device operatively coupled with the control and configured to provide at least first and second inputs to the control; and
the control is further configured to direct at least two of the four steering actuators to each angularly displace the coupled crawler assembly in the first angular direction when the control receives the first input and to alternatively direct the at least two steering actuators to each angularly displace the coupled crawler assembly in the second angular direction when the control receives the second input.

12. The system as recited in claim 11 wherein the steering device includes a steering member moveable between first and second limit positions, the steering member being configured to provide the first input to the control when the steering member is moved toward the first limit position and to provide the second input to the control when the steering member is moved toward the second limit position.

13. The system as recited in claim 12 wherein the steering member is rotatable between the two limit positions about a steering axis and the steering device further includes a position sensor coupled with the control and configured to sense an angular position of the steering member about the steering axis, the control being configured to angularly displace the at least two crawler assemblies to an angular position about each crawler axis at least generally corresponding with the steering member angular position.

14. The system as recited in claim 1 further comprising four position sensors each coupled with the control and configured to sense an angular position of a separate one of the crawler assemblies about the crawler axis.

15. The system as recited in claim 14 wherein:
each steering actuator includes a linearly displaceable member connected with the frame of the coupled crawler assembly such that movement of the displaceable member rotatably displaces the frame about the crawler vertical axis; and
each position sensor includes a linear position sensor configured to sense a position of the moveable member so as to sense the angular position of the frame about the vertical axis.

16. The system as recited in claim 1 wherein each steering actuator includes a hydraulic cylinder having a rod connected with one of the coupled crawler assembly and the mainframe and a cylinder connected with the other one of the crawler assembly and the mainframe, the rod being linearly displaceable with respect to the cylinder so as to angularly displace the crawler assembly about the crawler axis.

17. The system as recited in claim 16 wherein each steering actuator further includes a linear position sensor coupled with the control and configured to sense the position of the rod with respect to the cylinder so as to sense an angular position of the crawler assembly about the crawler axis.

18. The system as recited in claim 17 further comprising an operator steering device operatively coupled with and configured to provide at least first and second inputs to the control such that the control directs at least two hydraulic cylinders to each one of retract and extend so as to angularly displace the coupled crawler assembly in a first angular direction when the control receives the first input and directs the at least two hydraulic cylinders to each the other one of extend and retract so as to angularly displace the coupled crawler assembly in a second angular direction when the control receives the second input.

19. The system as recited in claim 1 wherein each crawler assembly includes a shaft having a first end connected with the mainframe and a second end connected with the crawler frame, the vertical axis extending centrally through the shaft and each steering actuator being connected with the shaft of the coupled crawler assembly.

20. The system as recited in claim 19 wherein at least a portion of the shaft is rotatable about the crawler vertical axis to angularly displace the crawler frame about the axis, each steering actuator having an end attached to the shaft rotatable portion of the coupled crawler assembly.

21. The system as recited in claim 1 wherein the control is configured to operate the four crawler motors such that each crawler assembly is driven at a predetermined speed, the predetermined speed of each crawler assembly being one of substantially equal to the predetermined speed of at least one other crawler assembly and substantially different than the predetermined speed of at least one other crawler assembly.

22. The system as recited in claim 21 wherein:
each crawler assembly further includes a speed sensor coupled with the control and configured to sense a speed of the crawler assembly; and
the control is configured to compare the sensed speed of at least one crawler assembly with the predetermined crawler speed and to operate the motor of the at least one crawler assembly such that sensed crawler assembly speed is about equal to the predetermined speed.

23. The system as recited in claim 22 wherein:
each crawler motor is a hydraulic motor and each speed sensor is configured to sense speed of the motor of the coupled crawler assembly;
the system further comprises at least one pump fluidly coupled with and configured to provide hydraulic fluid to at least one of the crawler motors, the at least one pump being adjustable such that a rate of fluid flow to the at least one motor is variable; and
the control is configured to compare sensed motor speed with the predetermined crawler speed and to adjust the pump flow rate so that sensed motor speed is about equal to the predetermined speed.

24. The system as recited in claim 23 wherein:
each motor is adjustable between a plurality of different settings and is configured to drive the coupled track at about a predetermined speed for a particular rate of fluid flow from the coupled pump at each setting, the predetermined track speed at each one of the motor settings being substantially different than the track speed at each other one of the motor settings; and
the control is configured to operate the four crawler motors and the two pumps in a plurality of vehicle travel modes, the control being configured to adjust each motor to one of the motor settings when adjusting to each one of the travel modes, the motor setting in each travel mode being different than the motor setting in each other travel mode, the control being further configured to adjust each pump as the crawler assemblies are driven in each one of the travel modes when the sensed speed of at least one of the tracks driven by one of the motors coupled with the pump varies from the predetermined speed for the motor setting of the travel mode.

25. The system as recited in claim 24 further comprising a travel mode selector coupled with the control and operable by a milling machine operator to selectively provide a plurality of travel mode inputs to the control, the control being configured to adjust to a separate one of the travel modes when the control receives each one of the plurality of travel mode inputs.

26. The system as recited in claim 24 wherein:
each crawler motor is a variable displacement hydraulic motor and the at least one pump is a variable displacement pump; and
the control is configured to adjust pump displacement so as to provide a desired fluid flow rate to the at least one coupled motor and to adjust displacement of each motor so as to adjust the motor setting.

27. The system as recited in claim 1 wherein:
each one of the crawler motors is a variable displacement hydraulic motor;

the system further comprises at least one variable displacement pump fluidly coupled with at least one of the crawler motors, the pump being configured to provide a flow of hydraulic fluid to the at least one motor, and four speed sensors, each speed sensor being coupled with the control and configured to sense a speed of each crawler assembly; and the control is configured to selectively operate the motors and the pump in at least a first speed mode in which the crawler assembly speed has a first value and second speed mode in which the crawler assembly speed has a second value, the control adjusting motor displacement to adjust between the speed modes and to adjust the pump flow rate so that sensed motor speed is at about the first value in the first speed mode and alternatively at the second value in the second speed mode.

28. The system as recited in claim 27 wherein:

the control is configured to selectively operate each crawler motor at first and second speeds;

the system further comprises a speed selector device operable by a user and configured to provide first and second inputs to the control, the control being configured to operate at least one of the crawler motors at the first speed when selector provides the first input and to alternatively operate the at least one motor at the second speed when the selector provides the second input.

29. The system as recited in claim 1 wherein:

each one of the front and rear pairs of crawler assemblies includes left and right crawler assemblies and each crawler motor includes a hydraulic motor; and the system further comprises a first pump fluidly coupled with the motor of each one of the front left crawler assembly and the rear left crawler assembly and a second pump fluidly coupled with the motor of each one of the front right crawler assembly and the rear right crawler assembly such that the two left crawler assemblies are drivable at a first variable speed by adjusting the first pump and the two right crawler assemblies are drivable at a second variable speed by the second pump, the second speed being one of about equal to, substantially greater than, and substantially lesser than the first speed.

30. A propulsion system for a road milling machine, the milling machine including a frame with a center, front and rear ends and left and right sides, the system comprising:

four crawler assemblies configured to displace the machine frame, each crawler assembly including a wheel frame movably coupled with the mainframe so as to be angularly displaceable with respect to the mainframe about a generally vertical axis and having a generally horizontal centerline, a plurality of wheels each rotatably coupled with the wheel frame and spaced along the frame centerline, an endless track disposed about the plurality of wheels and displaceable generally along the centerline, and a hydraulic motor connected with one of the wheels, drivable in opposing directions and configured to rotate the connected drive wheel so as to circulate the track in generally forward and reverse directions about the wheels, the four wheel assemblies being spaced apart and located with respect to the main frame so as to define a left pair of crawler assemblies including a front left crawler assembly and a rear left crawler assembly and a right pair of crawler assemblies including a front right crawler assembly and a rear right crawler assembly;

four steering actuator assemblies each operatively coupled with a separate one of the crawler assemblies and configured to angularly displace the coupled crawler assembly about the vertical axis independently of the others of the four crawler assemblies;

first and second pumps, the first pump being fluidly coupled with the motors of the left pair of crawler assemblies and the second pump being fluidly coupled with the right pair of crawler assemblies, each pump being configured to direct hydraulic fluid to each one of coupled motors so as to drive the two motors alternatively in forward and reverse directions; and a control operatively coupled with each of the four steering actuators and with each of the two pumps, the control being configured to separately and independently operate each steering actuator such that each crawler assembly is independently angularly positionable about the crawler axis and configured to operate the two pumps such the two motors of the left pair of crawler assemblies are drivable by the first pump in one of the forward and reverse directions while the two motors of the right pair of crawler assemblies are drivable by the second pump in the other one of the forward and reverse directions.

31. The system as recited in claim 30 wherein the control is further configured to operate the four crawler motors such that each crawler track is driven at a desired speed, the desired speed of each crawler track being one of substantially the same as the desired speed of at least one other crawler track and substantially different than the desired speed of the at least one other crawler assembly.

32. The system as recited in claim 30 wherein:

each motor is adjustable between a plurality of different settings and is configured to drive the coupled track at about a predetermined speed for a particular rate of fluid flow from the coupled pump at each setting, the predetermined track speed at each one of the motor settings being substantially different than the track speed at each other one of the motor settings;

each pump is adjustable to vary a rate of fluid flow from the pump to each coupled motor;

the system further comprises four speed sensors each coupled with the control and with a separate one of the crawler assemblies, each sensor being configured to sense a speed of the coupled crawler track; and the control is configured to operate the four crawler motors and the two pumps in a plurality of vehicle travel modes, the control being configured to adjust each motor to one of the motor settings when adjusting to each one of the travel modes, the motor setting in each travel mode being different than the motor setting in each other travel mode, the control being further configured to adjust each pump as the crawler assemblies are driven in each one of the travel modes when the sensed speed of at least one of the tracks driven by one of the motors coupled with the pump varies from the predetermined speed for the motor setting of the travel mode.

33. The system as recited in claim 32 wherein:

each crawler motor has an adjustable fluid displacement such that the motor has one of a plurality of different fluid displacement values at each motor setting, the motor being configured to drive the coupled track at about a separate one of the predetermined track speeds when adjusted to each fluid displacement value; and the controller is configured to adjust the fluid displacement of the motors to one of the plurality of fluid displacement values when adjusting to each one of the travel modes and is configured to adjust the flow rate of each one of the pumps when the sensed shaft rotational speed of one motor coupled with the pump varies from the predetermined speed for the motor setting.

34. The system as recited in claim 33 wherein:
each crawler motor has a drive member adjustable between a plurality of positions, the motor fluid displacement having a separate one of the plurality of displacement values at each drive member position, and an actuator coupled with the controller and configured to displace the drive member between the plurality of positions;
each pump has a drive member adjustable between a plurality of positions to vary fluid displacement of the pump so as to adjust the pump flow rate, and an actuator configured to displace the drive member between the plurality of drive member positions; and
the controller is configured to operate the actuator of each motor so as to adjust the motor setting and configured to operate the actuator of each pump so as to adjust the pump flow rate.

35. A propulsion system for a road milling machine, the milling machine including a frame with a center, front and rear ends and left and right sides, the system comprising:
four crawler assemblies configured to displace the machine frame, each crawler assembly including a wheel frame movably coupled with the mainframe so as to be angularly displaceable with respect to the mainframe about a generally vertical axis and having a generally horizontal centerline, a plurality of wheels each rotatably coupled with the wheel frame and spaced along the frame centerline, an endless track disposed about the plurality of wheels and displaceable generally along the centerline, and a hydraulic motor connected with one of the wheels, drivable in opposing di and configured to rotate the connected drive wheel so as to circulate the track in generally forward and reverse directions about the wheels, the four wheel assemblies being spaced apart and located with respect to the main frame so as to define a left pair of crawler assemblies including a front left crawler assembly and a rear left crawler assembly and a right pair of crawler assemblies including a front right crawler assembly and a rear right crawler assembly;
four steering actuator assemblies each operatively coupled with a separate one of the crawler assemblies and configured to angularly displace the coupled crawler assembly about the vertical axis;
first and second pumps, the first pump being fluidly coupled with the motors of the left pair of crawler assemblies and the second pump being fluidly coupled with the right pair of crawler assemblies, each pump being configured to direct hydraulic fluid to each one of coupled motors so as to drive the two motors alternatively in forward and reverse directions; and
a control operatively coupled with each of the four steering actuators and with each of the two pumps, the control being configured to separately operate each steering actuator such that each crawler assembly is independently angularly positionable about the crawler axis and configured to operate the two pumps such the two motors of the left pair of crawler assemblies are drivable by the first pump in one of the forward and reverse directions while the two motors of the right pair of crawler assemblies are drivable by the second pump in the other one of the forward and reverse directions;
wherein:
each motor is adjustable between a plurality of different settings and is configured to drive the coupled track at about a predetermined speed for a particular rate of fluid flow from the coupled pump at each setting, the predetermined track speed at each one of the motor settings being substantially different than the track speed at each other one of the motor settings;
each pump is adjustable to vary a rate of fluid flow from the pump to each coupled motor:
the system further comprises four speed sensors each coupled with the control and with a separate one of the crawler assemblies, each sensor being configured to sense a speed of the coupled crawler track; and
the control is configured to operate the four crawler motors and the two pumps in a plurality of vehicle travel modes, the control being configured to adjust each motor to one of the motor settings when adjusting to each one of the travel modes, the motor setting in each travel mode being different than the motor setting in each other travel mode, the control being further configured to adjust each pump as the crawler assemblies are driven in each one of the travel modes when the sensed speed of at least one of the tracks driven by one of the motors coupled with the pump varies from the predetermined speed for the motor setting of the travel mode;
wherein:
each crawler motor has an adjustable fluid displacement such that the motor has one of a plurality of different fluid displacement values at each motor setting, the motor being configured to drive the coupled track at about a separate one of the predetermined track speeds when adjusted to each fluid displacement value; and
the controller is configured to adjust the fluid displacement of the motors to one of the plurality of fluid displacement values when adjusting to each one of the travel modes and is configured to adjust the flow rate of each one of the pumps when the sensed shaft rotational speed of one motor coupled with the pump varies from the predetermined speed for the motor setting;
wherein:
each crawler motor has a drive member adjustable between a plurality of positions, the motor fluid displacement having a separate one of the plurality of displacement values at each drive member position, and an actuator coupled with the controller and configured to displace the drive member between the plurality of positions;
each pump has a drive member adjustable between a plurality of positions to vary fluid displacement of the pump so as to adjust the pump flow rate, and an actuator configured to displace the drive member between the plurality of drive member positions; and
the controller is configured to operate the actuator of each motor so as to adjust the motor setting and configured to operate the actuator of each pump so as to adjust the pump flow rate; and wherein:
each motor is a linear piston motor further having a body with a central axis, first and second ports, a plurality of bores fluidly coupleable with the first and second ports, a plurality of pistons each disposed within a separate one of the bores, the pump being configured such that flow into one of the first and second ports reciprocatingly linearly displaces the pistons and discharges the fluid out of the other one of the first and second ports, and an output shaft partially disposed within the body, the drive member including a swashplate mounted to the output shaft and each piston having a drive end disposed against the swashplate such that linear displacement of the at least one piston rotates the swashplate so as to rotate the output shaft about the axis; and
each pump is a linear piston pump further having a body with a central axis, first and second ports, and a plurality of bores fluidly coupleable with the first and second ports, a plurality of pistons each disposed within a separate one of the bores, an input shaft extending into the body and rotatable about a central axis, the drive member including a swashplate mounted to the input shaft and each piston having an end disposed against the plate such that rotation of the input shaft rotates plate so as to reciprocatingly linearly displace each piston to draw fluid into one of the first and second ports and to discharge fluid out of the other one of the first and second ports.

36. The system as recited in claim 35 wherein the first port of each pump is fluidly connected with the first port of each of the two coupled motors and the second port of each pump is fluidly connected with the second port of the two coupled motors such that fluid flow out of each pump first port flows into the first ports of the two coupled motors, drives each motor shaft in a first direction, flows out of each motor second port and into the coupled pump second port, and alternatively fluid flow out of each pump second port flows into the second ports of the two coupled motors, drives each motor shaft in a second, opposing direction, flows out of each motor first port and into the coupled pump first port.

37. The system as recited in claim 32 wherein the control is further configured to compare the sensed speed of each one of the left front and left rear crawler tracks and to separately compare the sensed speed of each one of the right front and right rear crawler assemblies, to adjust the setting of the motor of one of the left pair crawler assemblies so as to reduce the speed of the coupled crawler track when the sensed speed of the track is greater than the sensed track speed of the other one of the left pair of crawler assemblies such that the sensed speed of each one of the left pair of crawler assemblies is generally equal to the sensed speed of the other one of the left pair of crawler assemblies, and to adjust the setting of the motor of one of the right pair crawler assemblies so as to reduce the speed of the coupled crawler track when the sensed speed of the track is greater than the sensed track speed of the other one of the right pair of crawler assemblies such that the sensed speed of each one of the right pair of crawler assemblies is generally equal to the sensed speed of the other one of the right pair of crawler assemblies.

38. The system as recited in claim 32 wherein the control includes a microprocessor electrically connected with each one of the four crawler motors and the two pumps and a program installed within the microprocessor, the program being configured to selectively operate the four motors and the two pumps in each one of the plurality of vehicle travel modes.

39. The system as recited in claim 32 further comprising a travel mode selector device operatively coupled with the control and configured to selectively adjust the control between each one of the plurality of vehicle travel modes.

40. The system as recited in claim 39 wherein the mode selector device includes at least one user input member manipulatable by a milling machine operator to select the travel mode.

41. The system as recited in claim 40 further comprising an indicator device coupled with the control and configured to provide at least a first indication when the control is in a first travel mode and a second indication when the control is in a second travel mode.

42. The system as recited in claim 30 wherein each one of the pumps and the two motors coupled with each pump are fluidly connected in a closed hydraulic circuit such that fluid flow out of each pump flows into each of the two coupled motors and fluid flow out the two motors flows into the coupled pump.

43. The system as recited in claim 30 wherein each one of the four hydraulic motors is a variable displacement motor adjustable to a plurality of speed settings each providing a separate predetermined crawler track speed and each one of the two pumps is a variable displacement pump adjustable to provide a variable rate of fluid flow to each coupled motor.

44. The system as recited in claim 30 wherein the control is configured to sense a speed of each crawler assembly track, to compare the speeds of the tracks of the left pair of crawler assemblies and to separately compare the speeds of the tracks of the right pair of crawler assemblies, to adjust one of the motors of the left pair crawler assemblies so as to reduce the speed of the coupled crawler track when the sensed speed of the track is greater than the sensed track speed of the other one of the left pair of crawler assemblies such that the sensed speed of each one of the left pair of crawler assemblies is generally equal to the sensed speed of the other one of the left pair of crawler assemblies, and to adjust the one of the motors of the right pair crawler assemblies so as to reduce the speed of the coupled crawler track when the sensed speed of the track is greater than the sensed track speed of the other one of the right pair of crawler assemblies such that the sensed speed of each one of the right pair of crawler assemblies is generally equal to the sensed speed of the other one of the right pair of crawler assemblies.

45. The system as recited in claim 30 wherein the control is further configured to selectively and independently operate the four steering actuators in a plurality of different steering modes, one steering mode being a circle steer mode in which the control directs the four actuators such that one of the front pair of crawler assemblies independently angularly displaces in a first direction about the crawler vertical axis, the other one of the front pair of crawler assemblies independently angularly displaces in a second, opposing direction about the crawler vertical axis, one of the rear pair of crawler assemblies independently angularly displaces in the first direction about the crawler axis, and the other one of the rear pair of crawler assemblies independently angularly displaces in the second direction about the crawler axis.

46. The system as recited in claim 45 wherein the control configured to operate the four motors and the two pumps when in the circle steer mode such that the endless track of one of the front pair of crawler assemblies is rotated in a first angular direction, the track of the other one of the front pair of crawler assemblies is rotated in a second, opposing angular direction, the track of one of the rear pair of crawler assemblies is rotated in the first direction, and the track of the other one of the rear pair of crawler assemblies is rotated in the second direction such that the mainframe is angularly displaced generally about the mainframe center while the mainframe center remains generally at a fixed position on a base surface.

47. The system as recited in claim 45 wherein the control includes:
  a first controller operatively coupled with the four steering actuators; and
  a second controller operatively connected with the four crawler motors and with the two pumps.

48. A propulsion and steering system for a road milling machine, the milling machine including a frame with a center, the system comprising:
  four crawler assemblies each including a wheel frame movably coupled with the mainframe so as to be angularly displaceable with respect to the mainframe about a generally vertical axis and having a generally horizontal centerline, a plurality of wheels each rotatably coupled with the wheel frame and spaced along the frame centerline, an endless track disposed about the plurality of wheels and displaceable generally along the centerline, and a motor configured to rotate the track in first and second angular directions about the wheels, the four wheel assemblies being spaced apart and located with respect to the main frame so as to define a front left crawler assembly, a front right crawler assembly, a rear left crawler assembly and a rear right crawler assembly;

four steering actuator assemblies each operatively coupled with a separate one of the crawler assemblies and configured to angularly displace the coupled crawler assembly about the vertical axis independently of the others of the four crawler assemblies; and a control operatively coupled with each of the steering actuators and with each of the motors, the control operatively being configured to selectively and independently operate the four actuators, the control being configured to sense a speed of each crawler assembly track, to compare the speeds of the tracks of the front left and rear left crawler assemblies and to compare the speeds of the tracks of the front right and rear right crawler assemblies, to reduce motor speed of one of the left crawler assemblies when the sensed speed of the track of the one left crawler assembly is greater than the sensed track speed of the other left crawler assembly such that the sensed track speed of each one of the two left crawler assemblies is generally equal to the sensed track speed of the other one of the two left crawler assemblies, and to reduce motor speed of one of the two right crawler assemblies when the sensed speed of the track of the one right crawler assembly is greater than the sensed track speed of the other right crawler assembly such that the sensed track speed of each one of the two right crawler assemblies is generally equal to the sensed track speed of the other one of the two right crawler assemblies.

49. The system as recited in claim 48 further comprising first and second pumps, the first pump being fluidly coupled with the motors of the two left crawler assemblies and the second pump being fluidly coupled with the motors of the two right crawler assemblies, each pump being configured to direct hydraulic fluid to each one of the two coupled motors so as to drive the two motors alternately in forward and reverse directions.

50. The system as recited in claim 49 wherein the control is configured to operate the first and second pumps such the two motors of the left pair of crawler assemblies are drivable by the first pump in one of the forward and reverse directions and the two motors of the right pair of crawler assemblies are drivable by the second pump in the other one of the forward and reverse directions.

51. The system as recited in claim 49 wherein:
each motor is adjustable between a plurality of different settings and is configured to drive the coupled track at about a predetermined speed for a particular rate of fluid flow from the coupled pump at each setting, the predetermined track speed at each one of the motor settings being substantially different than the track speed at each other one of the motor settings;
each pump is adjustable to vary a rate of fluid flow from the pump to each coupled motor;
the system further comprises four speed sensors each coupled with the control and with a separate one of the crawler assemblies, each sensor being configured to sense a speed of the coupled crawler track; and
the control is configured to operate the four crawler motors and the two pumps in a plurality of vehicle travel modes, the control being configured to adjust each motor to one of the motor settings when adjusting to each one of the travel modes, the motor setting in each travel mode being different than the motor setting in each other travel mode, the control being further configured to adjust each pump as the crawler assemblies are driven in each one of the travel modes when the sensed speed of at least one of the tracks driven by one of the motors coupled with the pump varies from the predetermined speed for the motor setting of the travel mode.

52. The system as recited in claim 51 wherein:
each crawler motor has an adjustable fluid displacement such that the motor has one of a plurality of different fluid displacement values at each motor setting, the motor being configured to drive the coupled track at about a separate one of the predetermined track speeds when adjusted to each fluid displacement value; and
the controller is configured to adjust the fluid displacement of the motors to one of the plurality of fluid displacement values when adjusting to each one of the travel modes and is configured to adjust the flow rate of each one of the pumps when the sensed shaft rotational speed of one motor coupled with the pump varies from the predetermined speed for the motor setting.

53. The system as recited in claim 48 wherein the control is further configured to operate the four crawler motors such that each crawler track is driven at a desired speed, the desired speed of each crawler track being one of substantially the same as the desired speed of at least one other crawler track and substantially different than the desired speed of the at least one other crawler assembly.

54. The system as recited in claim 48 wherein the control is further configured to selectively and independently operate the four steering actuators in a plurality of different steering modes, one steering mode being a circle steer mode in which the control directs the four actuators such that one of the front pair of crawler assemblies independently angularly displaces in a first direction about the crawler vertical axis, the other one of the front pair of crawler assemblies independently angularly displaces in a second, opposing direction about the crawler vertical axis, one of the rear pair of crawler assemblies independently angularly displaces in the first direction about the crawler axis, and the other one of the rear pair of crawler assemblies independently angularly displaces in the second direction about the crawler axis.

55. A road milling machine comprising:
a mainframe with front and rear ends and a center;
a rotatable cutter drum coupled with the frame;
four crawler assemblies each movably coupled with the mainframe so as to be angularly displaceable about a vertical axis and including a frame, a plurality of wheels rotatably mounted to the frame, an endless track disposed about the wheels, and a motor configured to rotate at least one wheel in opposing angular directions so as to drive the endless belt in opposing angular directions about the plurality of wheels, the four crawler assemblies being spaced apart and located with respect to the main frame so as to define front and rear pairs of crawler assemblies;
four steering actuators each operatively coupled with a separate one of the four crawler assemblies and configured to angularly displace the coupled crawler assembly about the vertical axis independently of the others of the four crawler assemblies; and
a control operatively coupled with each one of the four steering actuators and with each one of the four motors, the control being configured to separately and independently operate each actuator such that each crawler assembly is angularly displaceable about the associated vertical axis independently of the other three crawler assemblies and to separately and independently operate each motor such that each crawler endless track is rotated about the associated plurality of wheels independently of the endless tracks of the other three crawler assemblies;

wherein the control includes a microprocessor electrically connected with each one of the four steering actuators and a program installed within the microprocessor, the program being configured to selectively and independently operate the four steering actuators in each one of a plurality of different steering modes.

56. The milling machine as recited in claim 55 wherein the control is configured to operate the four crawler assemblies in a circle steer mode such that one of the front pair of crawler assemblies is independently angularly displaced in a first direction about the crawler vertical axis, the other one of the front pair of crawler assemblies is independently angularly displaced in a second, opposing direction about the crawler vertical axis, one of the rear pair of crawler assemblies is independently angularly displaced in the first direction about the crawler axis, and the other one of the rear pair of crawler assemblies is independently angularly displaced in the second direction about the crawler axis.

57. The milling machine as recited in claim 56 wherein the control is further configured to operate the motors in the circle steer mode such that the endless track of one of the front pair of crawler assemblies is driven in a first angular direction, the track of the other one of the front pair of crawler assemblies is driven in a second, opposing angular direction, the track of one of the rear pair of crawler assemblies is driven in the first direction, and the track of the other one of the rear pair of crawler assemblies is driven in the second direction such that mainframe is angularly displaced generally about the mainframe center.

* * * * *